US009992004B2

(12) United States Patent
Mallik et al.

(10) Patent No.: US 9,992,004 B2
(45) Date of Patent: Jun. 5, 2018

(54) CODE BLOCK CLUSTER LEVEL HARQ

(71) Applicant: QUALCOMM Incorporated, San Diego, CA (US)

(72) Inventors: Siddhartha Mallik, San Diego, CA (US); Taesang Yoo, Riverside, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/965,458

(22) Filed: Dec. 10, 2015

(65) Prior Publication Data

US 2016/0226643 A1    Aug. 4, 2016

Related U.S. Application Data

(60) Provisional application No. 62/111,262, filed on Feb. 3, 2015.

(51) Int. Cl.
*H04L 1/18* (2006.01)
*H04L 5/00* (2006.01)
(Continued)

(52) U.S. Cl.
CPC .......... *H04L 5/0055* (2013.01); *H04L 1/0057* (2013.01); *H04L 1/0089* (2013.01); *H04L 1/18* (2013.01); *H04L 1/1819* (2013.01); *H04L 1/1896* (2013.01); *H04W 72/0446* (2013.01); *H04L 1/1822* (2013.01)

(58) Field of Classification Search
CPC .................................... H04L 1/1819
See application file for complete search history.

(56) References Cited

U.S. PATENT DOCUMENTS

| | | | | |
|---|---|---|---|---|
| 2002/0046379 A1* | 4/2002 | Miki | ...................... | H04L 1/0026 714/749 |
| 2010/0278093 A1* | 11/2010 | Wang | .................... | H04L 1/0025 370/312 |
| 2011/0055652 A1* | 3/2011 | Park | ...................... | H04L 1/1819 714/748 |

FOREIGN PATENT DOCUMENTS

WO    WO-2009126902 A2    10/2009

OTHER PUBLICATIONS

ISA/EPO, International Search Report and Written Opinion of the International Searching Authority, Int'l Appl. No. PCT/US2015/065337, dated Mar. 15, 2016, European Patent Office, Rijswijk, NL, 12 pgs.

* cited by examiner

*Primary Examiner* — Hoon J Chung
(74) *Attorney, Agent, or Firm* — Holland & Hart LLP

(57) ABSTRACT

Methods, systems, and devices are described for wireless communication. Wireless devices may exchange data using Medium Access Control (MAC) layer units known as transport blocks. The transport blocks may be partitioned into code block clusters (CBCs), each of which may include one or more code blocks. A receiving device may attempt to decode a transport block and send acknowledgement (ACK) and negative-acknowledgment (NACK) information to the transmitting device based on the whether each CBC was successfully decoded. The transmitting device may retransmit a redundancy version of a CBC for each NACK received. The transmitting device may group CBCs in segments of a transport block according to redundancy version. In some cases, the transmitting device may send a control message in a control channel which indicates the composition of the transport block.

30 Claims, 15 Drawing Sheets

(51) Int. Cl.
*H04W 72/04* (2009.01)
*H04L 1/00* (2006.01)

CODE BLOCK CLUSTER LEVEL HARQ

CROSS REFERENCES

The present application for patent claims priority to U.S. Provisional Patent Application No. 62/111,262, entitled, "Code Block Cluster Level HARQ", filed Feb. 3, 2015, assigned to the assignee hereof, and expressly incorporated by reference herein.

BACKGROUND

The following relates generally to wireless communication, and more specifically to code block cluster (CBC) level hybrid automatic repeat request (HARQ).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some wireless communications systems, wireless devices may exchange data using Medium Access Control (MAC) layer units known as transport blocks. A receiving device may process the transport blocks and send acknowledgement information to the base station regarding their status. If a transport block is corrupt, the transmitting device may retransmit the entire transport block. However, in some instances only a portion of a transport block may be corrupt. Thus, retransmitting entire transport blocks may decrease system performance.

SUMMARY

Systems, methods, and apparatuses for code block cluster (CBC) level hybrid automatic repeat request (HARQ) are described. Wireless devices may exchange data using Medium Access Control (MAC) layer units known as transport blocks. The transport blocks may be partitioned into CBCs, each of which may include one or more code blocks. A receiving device may attempt to decode a transport block and send acknowledgement (ACK) and negative-acknowledgment (NACK) information to the transmitting device based on the whether each CBC was successfully decoded. The transmitting device may retransmit a redundancy version of CBC for each NACK received. The transmitting device may group CBCs in segments of a transport block according to redundancy version. In some cases, the transmitting device may send a control message in a control channel which indicates the composition of the transport block.

A method of communication at a wireless device is described. The method may include identifying a redundancy version of a first CBC for transmission during a TTI, identifying a version of a second CBC for transmission during the TTI, and transmitting a transport block including the redundancy version of the first CBC and the version of the second CBC during the TTI.

An apparatus for communication at a wireless device is described. The apparatus may include means for identifying a redundancy version of a first CBC for transmission during a TTI, means for identifying a version of a second CBC for transmission during the TTI, and means for transmitting a transport block including the redundancy version of the first CBC and the version of the second CBC during the TTI.

A further apparatus for communication at a wireless device is described. The apparatus may include a processor, memory in electronic communication with the processor, and instructions stored in the memory. The instructions may be executable by the processor to identify a redundancy version of a first CBC for transmission during a TTI, identify a version of a second CBC for transmission during the TTI, and transmit a transport block including the redundancy version of the first CBC and the version of the second CBC during the TTI.

A non-transitory computer-readable medium storing code for communication at a wireless device is described. The code may include instructions executable to identify a redundancy version of a first CBC for transmission during a TTI, identify a version of a second CBC for transmission during the TTI, and transmit a transport block including the redundancy version of the first CBC and the version of the second CBC during the TTI.

In some examples of the method, apparatuses, or non-transitory computer-readable medium described above, the version of the second CBC transmitted during the TTI includes a redundancy version or a new version of the second CBC. Additionally or alternatively, some examples may include processes, features, means, or instructions for configuring the transport block based at least in part on a set of redundancy version segments, each redundancy version segment of the set including a subset of CBCs having a same redundancy version.

Some examples of the method, apparatuses, or non-transitory computer-readable medium described above may further include processes, features, means, or instructions for transmitting a control message for the TTI that includes an indication of which redundancy version segments are included in the transport block. Additionally or alternatively, in some examples, the control message for the TTI includes an indication of a redundancy version associated with each CBC included in the transport block.

In some examples of the method, apparatuses, or non-transitory computer-readable medium described above, the indication includes four bits corresponding to a combination of redundancy version segments. Additionally or alternatively, in some examples, the control message also includes an ACK/NACK failure indicator.

Some examples of the method, apparatuses, or non-transitory computer-readable medium described above may further include processes, features, means, or instructions for determining whether an ACK or a NACK was received for a transmitted CBC, and the ACK/NACK failure indicator may be based at least in part on the determination. Additionally or alternatively, some examples may include processes, features, means, or instructions for storing a HARQ state corresponding to a set of transmitted CBCs.

Some examples of the method, apparatuses, or non-transitory computer-readable medium described above may further include processes, features, means, or instructions for receiving an ACK/NACK response for the set of transmitted CBCs, and updating the HARQ state based at least in part on the ACK/NACK response. Additionally or alternatively, some examples may include processes, features, means, or instructions for determining that an ACK/NACK response has not been received for the set of transmitted CBCs, and refraining from updating the HARQ state based at least in part on the determination.

In some examples of the method, apparatuses, or non-transitory computer-readable medium described above, the transmitted transport block includes at least one cyclic redundancy check (CRC) field.

A further method of communication at a wireless device is also described. The method may include identifying a redundancy version of a first CBC for reception during a TTI, identifying a version of a second CBC for reception during the TTI, and receiving a transport block including the redundancy version of the first CBC and the version of the second CBC during the TTI.

A further apparatus for communication at a wireless device is described. The apparatus may include means for identifying a redundancy version of a first CBC for reception during a TTI, means for identifying a version of a second CBC for reception during the TTI, and means for receiving a transport block including the redundancy version of the first CBC and the version of the second CBC during the TTI.

A further apparatus for communication at a wireless device is also described. The apparatus may include a processor, memory in electronic communication with the processor, and instructions stored in the memory. The instructions may be executable by the processor to identify a redundancy version of a first CBC for reception during a TTI, identify a version of a second CBC for reception during the TTI, and receive a transport block including the redundancy version of the first CBC and the version of the second CBC during the TTI.

A non-transitory computer-readable medium storing code for communication at a wireless device is described. The code may include instructions executable to identify a redundancy version of a first CBC for reception during a TTI, identify a version of a second CBC for reception during the TTI, and receive a transport block including the redundancy version of the first CBC and the version of the second CBC during the TTI.

In some examples of the method, apparatuses, or non-transitory computer-readable medium described above, the version of the second CBC transmitted during the TTI includes a redundancy version or a new version of the second CBC. Additionally or alternatively, in some examples, the transport block may be based at least in part on a set of redundancy version segments, each redundancy version segment of the set including one or more CBCs having a same redundancy version.

Some examples of the method, apparatuses, or non-transitory computer-readable medium described above may further include processes, features, means, or instructions for receiving a control message for the TTI that includes an indication of which redundancy version segments are included in the transport block. Additionally or alternatively, in some examples, the indication includes four bits corresponding to a combination of redundancy version segments.

In some examples of the method, apparatuses, or non-transitory computer-readable medium described above, the control message may also include an ACK/NACK failure indicator. Additionally or alternatively, some examples may include processes, features, means, or instructions for storing a HARQ state corresponding to a set of received CBCs.

Some examples of the method, apparatuses, or non-transitory computer-readable medium described above may further include processes, features, means, or instructions for updating the HARQ state based at least in part on processing a CRC associated with one or more of the set of received CBCs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
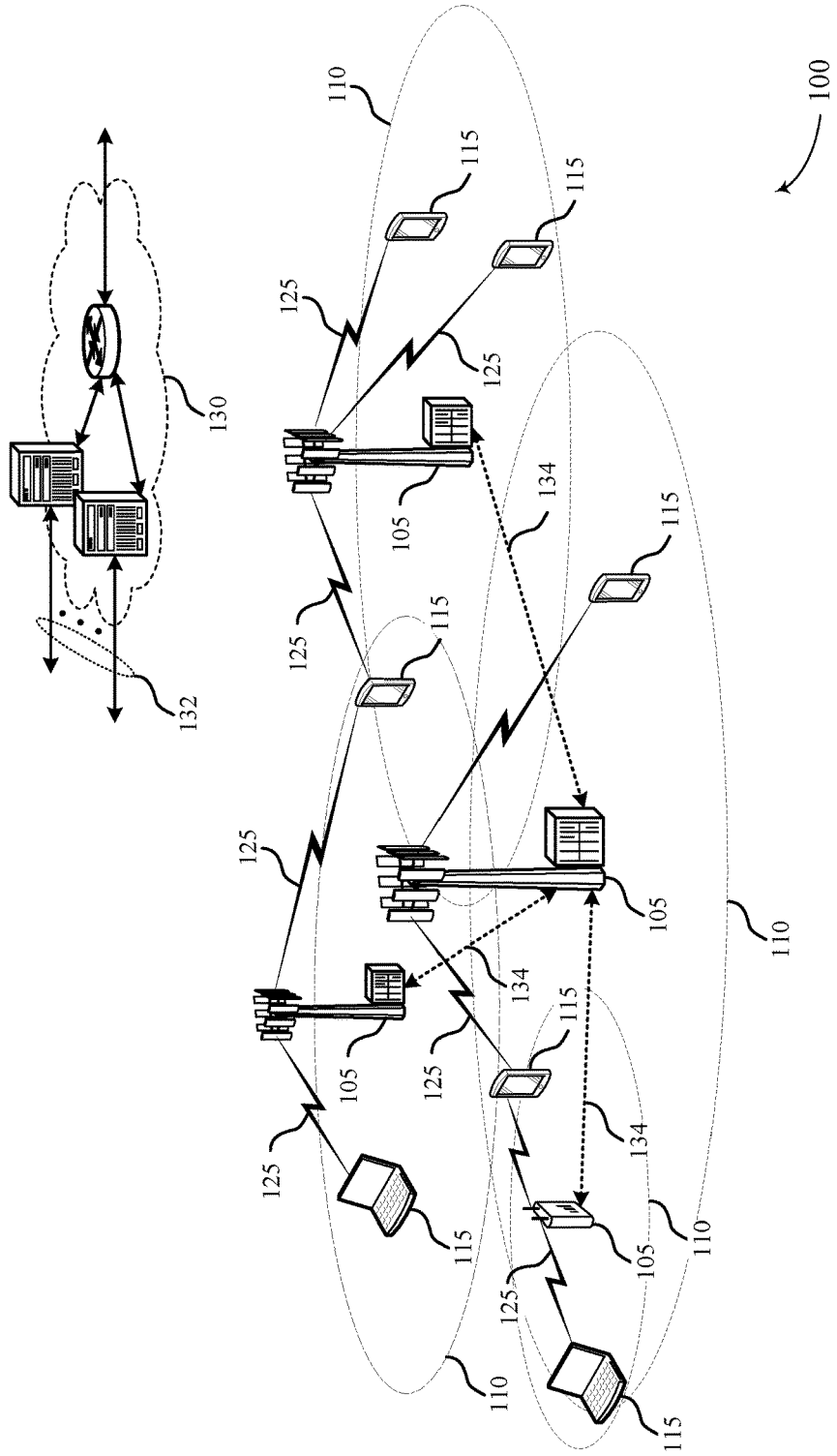
FIG. 1 illustrates an example of a wireless communications system for code block cluster (CBC) level hybrid automatic repeat request (HARQ) in accordance with various aspects of the present disclosure.

In some wireless communication systems, a transmitting device such as a base station, may communicate control and data to a receiving device user equipment (UE) using Medium Access Control (MAC) layer units known as transport blocks. The receiving device may respond with an acknowledgment (ACK) or a negative acknowledgement (NACK). According to the present disclosure, transport blocks may be configured with subunits known as code block clusters (CBCs), and an ACK/NACK response may be sent for each CBC. CBCs within a transport block may be grouped according to redundancy versions, and additional control information may be transmitted with each transport block indicating which redundancy version segments, which may include subsets of CBCs have a common redundancy version, are present. Both the receiving and the transmitting device may maintain a state vector representing the status of each CBC to ensure both devices know which CBCs are to be transmitted or received in a given TTI.

Increased ACK/NACK granularity may affect uplink (UL) and downlink (DL) control channel messaging, which may be addressed as described below. For example, sending ACKs/NACKs for CBCs may increase ACK/NACK traffic on the UL; the UL control channel may thus be configured support a larger payload of ACKs/NACKs. Additionally, the DL control channel may benefit from efficient signaling of redundancy versions for each code block in the transport block. For instance, systems that implement CBC ACKs/NACKs may enjoy just-in-time ACKs/NACKs—e.g., when a base station schedules a UE in a DL burst—and the ACKs/NACKs for the data which was scheduled in previous bursts may be available at the base station.

The downlink may include a channel which carries data assigned to particular UEs (e.g., the physical downlink shared channel (PDSCH)). At the logical level, the data may be packaged in medium access control (MAC) transport blocks. In order to transmit data at the physical (PHY) layer, the base station may map the transport block data to resource elements (REs) within a resource block (e.g., one resource block may have 84 resource elements) for transmission over the air. A transport block may be made up of a number of sub-segments called code blocks.

A base station may define a transport block by selecting a modulation and coding scheme (MCS) for the transport block, allocating radio resources (e.g., time and frequency) for the transport block, and picking the number of bits to transmit in the transport block. The number of coded bits may be equal to the number of REs multiplied by the modulation order and rank (e.g., 1000 REs with 64QAM (quadrature amplitude modulation) rank two will result in twelve-thousand coded bits). The base station may make such transport block-defining decisions based on outer loop, fairness, and buffer status.

After a base station transmits transport block data to a UE, the UE may send an acknowledgment (ACK) or negative acknowledgment (NACK) indicating the reception status of the data. For instance, if the data is not correctly received by the UE (e.g., a cyclic redundancy check (CRC) fails) the UE may send a NACK to the base station requesting a retransmission of the data (e.g., a redundancy version of the data). In some scenarios, code blocks may be grouped together to form code block clusters (CBCs); for instance, a CBC may be an aggregation of one or more code blocks. Thus, a transport block may be made up of a number of CBCs, each of which may have the same or different number of code blocks. In such cases, the CBCs may be the minimum unit of PDSCH that is ACKed. A CRC may be performed on a code block, CRC, or transport block, or any combination thereof.

After defining the transport block, the base station may partition the transport block into redundancy version (RV) segments. A redundancy version represents a number of consecutive times a version of a given code block cluster has been transmitted. Each RV segment may contain one or more CBCs with the same redundancy version. For example, a transport block may include three RV segments and one segment which carries new data. In order to indicate to a UE the contents of the transport block, the base station may use a 4 bit mask in the physical downlink control channel (PDCCH). The mask may indicate which of the RV segments are present in the current grant. For example, mask with value "0001" may indicate that only new data is present in the transport block, while a value of "1001" may indicate that new data and one of the three RV segments is present.

A base station may employ an indicator (e.g., a "failsafe" bit) in PDCCH, which may indicate to a UE whether an ACK/NACK for a CBC has been received. For instance, a base station may use the failsafe bit on DL subframe k if an ACK/NACK was received at the base station on subframe k−1. In some cases, each code block may have a unique 64 bit identification (ID) which is carried in a header. In such instances, the ACKs/NACKs sent by a UE may have a hash of the code block IDs in each CBC, which the base station may use to identify the associated CBC.

A base station and UE may each keep track of which redundancy version is next to be transmitted/received. For example, the base station and UE may independently maintain a vector which indicates the redundancy version of CBCs currently queued to be sent. The UE may update the redundancy version vector (e.g., increase the redundancy version for CBCs) based on the success of decoding PDCCH. For example, the UE may update the redundancy version vector when the PDCCH is successfully decoded, and maintain the current status of the redundancy version vector when the PDCCH is not successfully decoded. The base station may update the redundancy vector based on the reception of ACK/NACKs from the UE. For example, if the base station receives an ACK/NACK from the UE, the base station may update the redundancy version vector. If the base station does not receive an ACK/NACK from the UE, the base station may maintain the current status of the redundancy version vector. The base station may also retransmit the same redundancy versions as before—e.g., the redundancy versions indicated by the redundancy version vector—accompanied by the fail-safe bit to indicate to the UE that the redundancy versions have not changed.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 for CBC level hybrid automatic repeat request HARQ in accordance with various aspects of the present disclosure. The wireless communications system 100 includes base stations 105, a user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on internet protocol (IP). A radio link control (RLC) layer may perform packet segmentation and reassembly to communicate over logical channels. A medium access control (MAC) layer may perform priority handling and multiplexing of logical channels into transport channels. The transport channels may be in transport blocks at the bottom of the MAC. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels. For example, a MAC layer transport block may be mapped to a subframe at the PHY layer. The transport block may include a CRC field for error detection at the receiver. Thus, HARQ may be implemented on a transport block-level basis. However, HARQ may also be implemented according to a finer resolution. For example, a transport block may be divided into smaller size data chunks called code blocks, each of which may have a CRC that a UE 115 may use for HARQ. The code blocks may be grouped into CBCs, the corruption of which may be monitored using HARQ. The size of a code block may be predefined, and in some cases may be limited to a minimum or maximum number of bits.

The number of bits transferred in a transport block may be based on the modulation and coding scheme (MCS), as well as the number of resource blocks assigned to the UE for which the transport block is intended. The MAC of a base station 105 may identify or determine a modulation scheme which can be handled by a UE 115 and check the physical resources for availability of resource blocks. Using this information, the MAC of the base station 105 may identify or determine an MCS and the number of resource blocks that can be allocated to the UE 115. In some instances, the MCS and resource allocation may be used to reference a table which gives the transport block size for the subframe. If the transport block size is greater than a maximum code block size, the transport block may be segmented into code blocks.

If the transport block is smaller than a minimum code block size, the transport block may be represented by one code block, which may be appended with filler bits to match the minimum code block size.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, or the like. The terms "carrier," "component carrier," and "cell" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced CCs (eCC). An eCC may be characterized by features, including: flexible bandwidth, variable length TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a variable TTI length and symbol duration. In some cases an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In other examples, the numerology of resources of the eCC may be different from numerology of another CC, which may employ TTIs defined in a version or release of, for example, a particular LTE standard.

Flexible bandwidth and variable TTIs may be associated with a modified control channel configuration—e.g., an eCC may utilize an enhanced physical downlink control channel (ePDCCH) for DL control information, which may perform some of the functions of the PDCCH described below. In some cases, control channels of an eCC may utilize frequency division multiplexed (FDM) control channels to accommodate flexible bandwidth or UEs 115 having differing bandwidth capabilities. Other control channel modifications may include the use of additional control channels—e.g., for eMBMS scheduling or to indicate the length of variable length UL and DL bursts—or control channels transmitted at different intervals. An eCC may also include modified or additional HARQ-related control information. In some cases, a UE 115 may employ CBC level HARQ on an eCC.

Wireless system 100 may implement error detection codes for transmissions to detect accidental changes to raw data. For example, a CRC may be used to detect errors during the decoding of received data. Before transmission, the CRC may be derived from the data according to a predetermined calculation. The CRC may then be appended to the data, which is subsequently transmitted. The receiving entity may perform the same calculation and check the result against the CRC bits. If the CRC bits do not match the calculated value, the CRC may be deemed to have failed, and the receiving entity may determine that the data has been corrupted.

HARQ may be a method of ensuring that data is received correctly over a wireless communication link 125. The MAC layer may be responsible for managing the HARQ function, which may be a transport block level automatic retry. HARQ may include a combination of error detection (e.g., using a CRC), FEC, and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data.

For example, a UE 115 may buffer a number of failed CBCs for use with redundancy versions to reconstruct a signal. The UE 115 may store the unsuccessfully decoded CBCs in buffers to use in conjunction with redundancy versions in the reconstruction of the data. In some cases, redundancy bits are added to each message prior to transmission. This may be especially useful in poor radio conditions. In other cases, redundancy bits are not added to each transmission, but are retransmitted after the transmitter of the original message receives a NACK indicating a failed attempt to decode the information. HARQ may be done in combination between the MAC and the PHY; the PHY may handle retention and re-combination and the MAC may perform management and signaling. For example, when there is a transport block CRC failure, the PHY may indicate the failure to the MAC. Accordingly, the MAC may indicate a NACK, which may prompt a retransmission from the transmitting entity which originally sent the transport block.

A base station 105 may schedule DL resources using a PDCCH. PDCCH may carry downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and CRC bits attached to each DCI may be scrambled based on the C-RNTI. To reduce power consumption and overhead at the user equipment, a limited set of CCE locations can be specified for DCI associated with a specific UE 115. A UE 115 may attempt to decode DCI by performing a process known as a blind decode, during which search spaces are randomly decoded until the DCI is detected. During a blind decode, the UE 115 may attempt to descramble all potential DCI messages using its C-RNTI, and perform a cyclic redundancy check (CRC) to determine whether the attempt was successful.

According to the present disclosure, wireless devices such as a base station 105 and a UE 115 may exchange data using MAC layer units known as transport blocks. The transport blocks may be partitioned into CBCs, each of which may include one or more code blocks. For example, a UE 115 may attempt to decode a transport block and send ACK/NACK information to a base station 105 based on the whether each CBC was successfully decoded. The base station 105 may retransmit a redundancy version of CBC for each NACK received. The base station 105 may group CBCs in segments of a transport block according to redundancy version. In some cases, the base station 105 may send a control message in a control channel which indicates the composition of the transport block.

Figure 2:
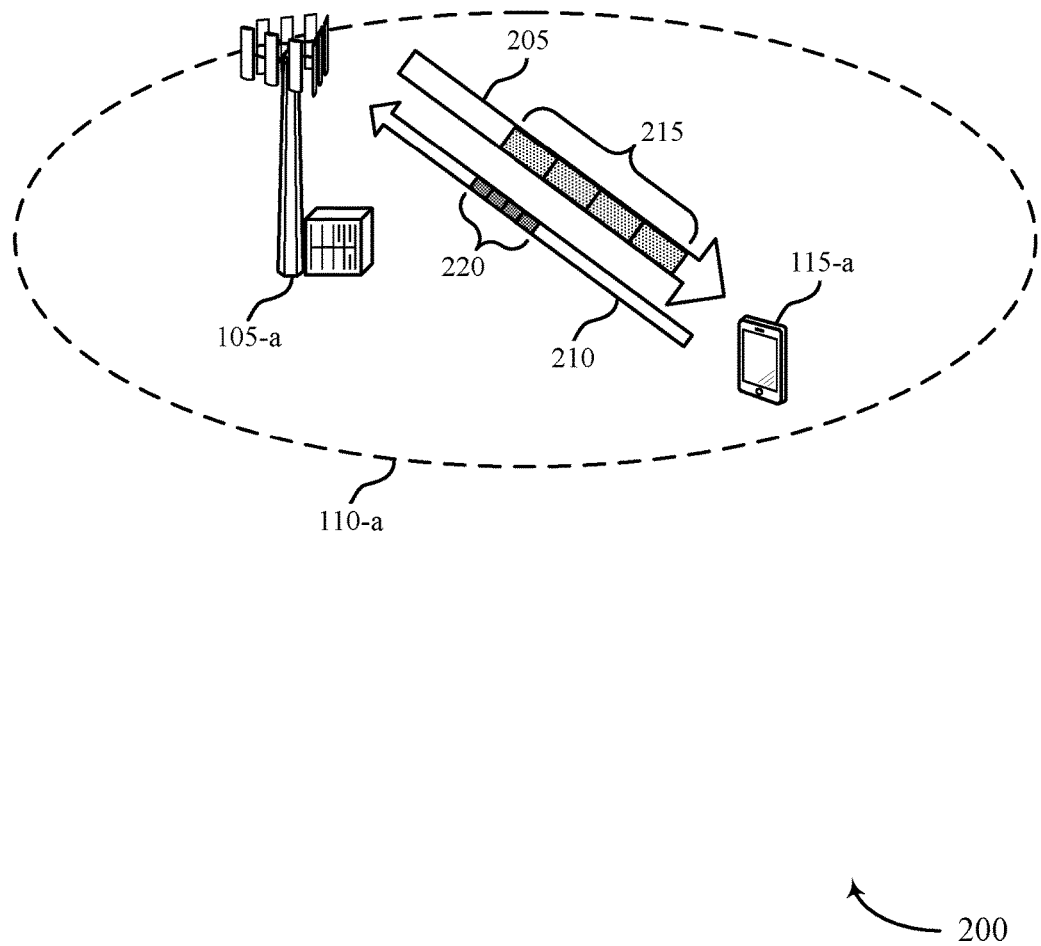
FIG. 2 illustrates an example of a wireless communications system for CBC level HARQ in accordance with various aspects of the present disclosure.

FIG. 2 illustrates an example of a wireless communications system 200 for CBC level HARQ in accordance with various aspects of the present disclosure. Wireless communications system 200 may include UE 115-a, which may be an example of a UE 115 described with reference to FIG. 1. Wireless communications system 200 may also include a base station 105-a, which may be an example of a base station 105 described with reference to FIG. 1. Base station 105-a may transmit control and data to any UE 115 within its coverage area 110-a via downlink (e.g., downlink 205). For instance, base station 105-a may transmit data to UE 115-a in a transport block 215, which may be part of downlink 205. UE 115-a may communicate with base station 105-a via uplink (e.g., uplink 210). For example, UE 115-a may indicate the status for portions of transport block 215 via acknowledgments (ACKs) and negative acknowledgments (NACKs) (e.g., ACK/NACKs 220).

In some cases, transport block 215 may include multiple CBCs, each of which includes a number of code blocks. The CBCs may be grouped into segments according to the redundancy version (RV) of the CBCs; for example, there may be four RV segments corresponding to four possible RVs, as illustrated in wireless communications system 200. Different transport blocks may have the same or different number of CBCs. CRC parity bits may be included with each code block, and, in some cases, for a CBC or for the transport block as a whole. The UE 115-a may use CRCs to detect errors during the decoding process and transmit ACK/NACKs 220 accordingly. For example, UE 115-a may send CBC level ACK/NACKs 220, and base station 105-a may transmit redundancy versions of one or more of the CBCs based on the ACK/NACKs 220. The retransmitted CBCs may be redundancy versions of CBCs which were NACKed by UE 115-a.

In other words, the CBCs may be the minimum unit of PDSCH that is ACK/NACKed. For example, UE 115-a may transmit a NACK for a CBC if a CRC fails for one or more code blocks in the CBC. The CRC failure may occur at the code block level, or at the CBC level. That is, a NACK may be transmitted if code block-level CRC fails, or if a CBC level CRC fails. The NACK may serve as an indication to base station 105-a to resend the CBC—e.g., base station 105-a may send a redundancy version of a CBC.

Additional control information may be transmitted along with each transport block to facilitate the CBC level HARQ. For example, base station 105-a may indicate to UE 115-a which RV segments are present in a transport block. In some examples, this may take the form a four (4) bit mask included in a PDCCH message. Each bit may be toggled if one or more CBCs in the transport block have a corresponding RV value. Another field may be used to indicate whether the transmitting device (e.g., base station 105-a) received the ACK/NACK from a previous transport block. This may enable the transmitting device and the receiving device to maintain synchronized status information for each CBC. So, if base station 105-a does not receive any ACK/NACK information it may retransmit the same data along with the ACK/NACK failure indicator. If UE 115-a receives the ACK/NACK failure indicator, it may anticipate the same information again. If UE 115-a receives PDCCH and the ACK/NACK failure indicator is absent, it may anticipate new data, or subsequent redundancy versions for CBCs that did not pass the CRC.

Figure 3:
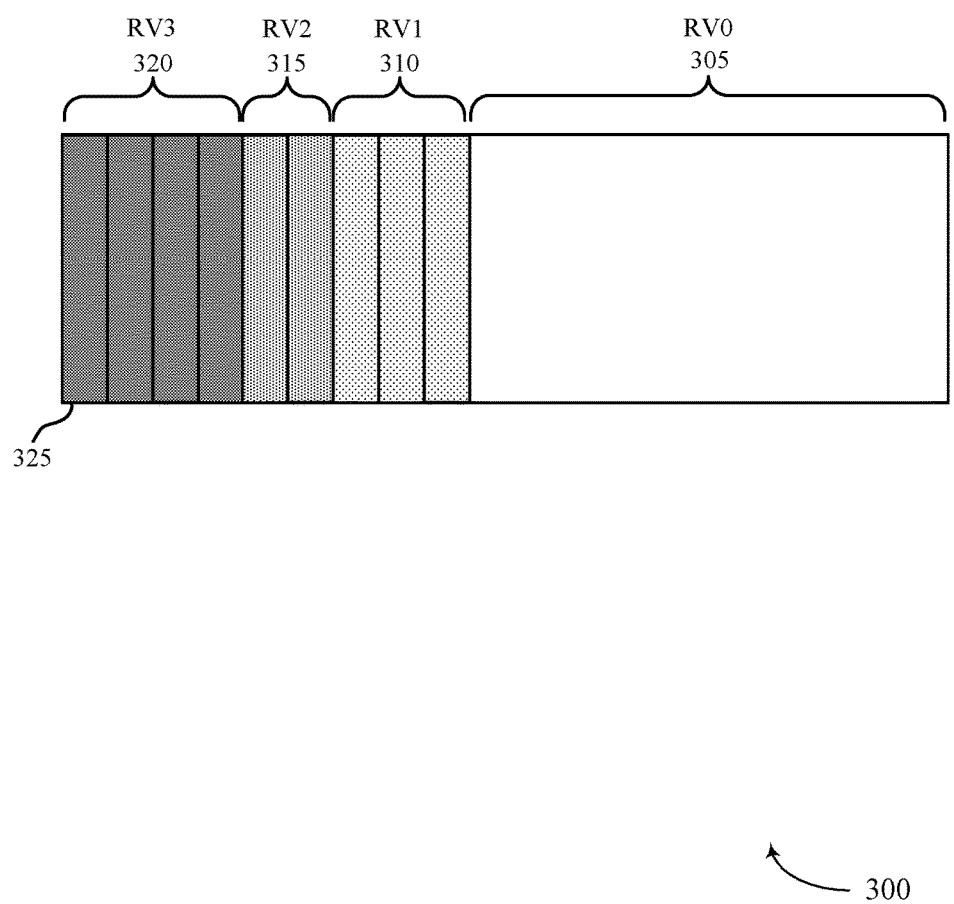
FIG. 3 illustrates an example of a transport block for CBC level HARQ in accordance with various aspects of the present disclosure.

Next, FIG. 3 illustrates an example of a transport block 300 for CBC level HARQ in accordance with various aspects of the present disclosure. Transport block 300 may be an example of a transport block sent from a base station 105 to a UE 115, as described with reference to FIG. 2. Transport block 300 may include a new data segment 305, a first RV segment 310, a second RV segment 315, and a third RV segment 320. An RV segment may include one or several CBCs 325, all of which may have the same redundancy version. In other words, the CBCs that are being re-transmitted for the nth time may be aggregated in an RV segment.

New data segment 305 may include data which is being sent to a UE 115 from a base station 105 for the first time. New data segment 305 may be an RV segment which includes data with redundancy version zero (RV0). New data segment 305 may include a number of CBCs (not shown), each of which may include one or more code blocks. The UE 115 may decode the code blocks of new data segment 305 and send a CBC level ACK/NACK based on the success of the decoding. For example, if a code block within a CBC fails CRC, the UE may indicate a NACK to the base station 105 indicating the decoding failure.

First RV segment 310 may include the first retransmissions (e.g., RV1) of CBCs which were incorrectly received during a previous transport block. The retransmissions may be the result of NACKs associated with CBCs conveyed by a new data segment 305 during a previous transport block 300. First RV segment 310 may include three CBCs, which may be CBCs with the same redundancy version (e.g., redundancy version one). The UE 115 may send a NACK for each CBC 325 associated with a failed CRC. In other words, the CBCs 325 may be individually decoded and ACKed/NACKed.

Second RV segment 315 may convey second redundancy versions (RV2) of CBCs 325 whose first redundancy versions were incorrectly received in a first RV segment 310 of a previous transport block. For example, RV segment 315 may include two CBCs 325, which may be redundancy versions of two CBCs whose first redundancy versions conveyed in a previous first RV segment 310 were not correctly received. In other words, second RV segment 315 may be used to retransmit CBCs 325 which were incorrectly received during both an original transmission and in a subsequent retransmission. If a CBC 325 in second RV segment 315 fails decoding, a NACK may be sent which may engender a third redundancy version of the CBC 325 in third RV segment 320.

Thus, third RV segment 320 may include CBCs which are on their third round of retransmission (RV3). That is, CBCs 325 may be redundancy version of CBCs 325 which have been incorrectly received in three previous transmissions/retransmissions. For example, third RV segment 320 may convey four CBCs 325, which may be the third redundancy versions of their respective CBCs. Accordingly, a CBC 325 may be a retransmission of a CBC 325 which failed decoding when conveyed by a previous new data segment 305, first RV segment 310, and second RV segment 315. In other words, redundancy versions of a transport block CBC may be sent in RV segments until the CBC is properly decoded—e.g., the base station receives an ACK—or the UE experiences a radio link failure (RLF).

The first, second, and third redundancy versions of CBCs may be sent using the same or different encoding. Although shown with three RV segments 310, 315, 320, transport block 300 may include any number of RV segments. Additionally, the RV segments may be of any length—e.g., the RV segments may include any number of CBCs 325. In some examples, the RV segments are the same length; in some examples, the RV segments are different lengths. The composition of transport block 300 may be dynamically configurable, and the segments may be present or absent based on the data being sent. For example, if all CBCs 325 conveyed by transport block 300 are successfully received, a subsequent transport block 300 may include only new data segment 305.

A base station 105 may indicate the configuration of a transport block using a bit mask in a control channel. For example, a base station 105 may use a N bit mask on the physical downlink control channel (PDCCH) for an N segment transport block. Thus, each bit may represent the presence or absence of its respective segment. In the four (4) segment example of transport block 300, a mask value of "0001" may indicate to a UE 115 that transport block 300 includes only new data segment 305, while a mask value of "1001" may indicate that transport block 300 includes both new data segment 305 and third RV segment 320. Accordingly, a UE 115 may reference the control channel bit mask to determine the configuration of a transport block. The control channel may also include a fail-safe bit (e.g., an ACK/NACK failure indicator), which may indicate the reception of an ACK/NACK at the base station 105. For example, if an ACK/NACK is received for subframe k−1, the base station 105 may indicate the ACK/NACK reception to the UE 115 using the fail-safe bit on subframe k.

A base station 105 and a UE 115 may use an identification scheme to account for which code blocks have been ACKed and which are to be retransmitted. In one scheme, each code block may have a unique identifier (ID) (e.g., 64 bits) which identifies the code block from other code blocks. A code block ID may be carried by a code block header, which may be the same length as the ID. Thus, based on the code block ID, the UE 115 may identify which code blocks have been successfully and unsuccessfully decoded and relay that information to the base station 105. For example, in each CBC ACK/NACK, the UE 115 may include a hash of the code block IDs in the CBC. In some cases, the base station may reference the hash of code block IDs to determine the associated CBC, which the base station may retransmit if the hash was conveyed by a NACK.

A base station 105 and a UE 115 may employ a redundancy version tracking scheme to synchronize the transmissions of CBC redundancy versions. In some examples, a base station 105 and a UE 115 each independently maintain a redundancy version state vector that tracks the current redundancy version of each CBC. The vectors may be referenced to determine which CBC redundancy version is next to be transmitted/received. A base station 105 may update its vector based on ACK/NACKs from a UE 115, and the UE 115 may update its vector based on decoding PDCCH. For example, a base station 105 may transmit a transport block which includes several RV segments, each with a number of CBC redundancy versions. The UE 115 may attempt to decode PDCCH. If decoding PDCCH is successful, the UE 115 may decode the transport block, update the redundancy version vector accordingly, and send ACK/NACKs as appropriate. Upon reception of the ACK/NACKs, the base station 105 may update the redundancy version vector and transmit redundancy versions accordingly. If decoding PDCCH is unsuccessful, the UE 115 may not receive the transport block, update the redundancy version vector, or send ACK/NACKs. Consequently, the base station may not receive ACK/NACKs. Accordingly, the base station may refrain from updating the redundancy version vector and retransmit the same redundancy versions. The base station 105 may send an ACK/NACK failure indicator to the UE 115, which may indicate that the previous redundancy versions are being re-transmitted.

Figure 4:
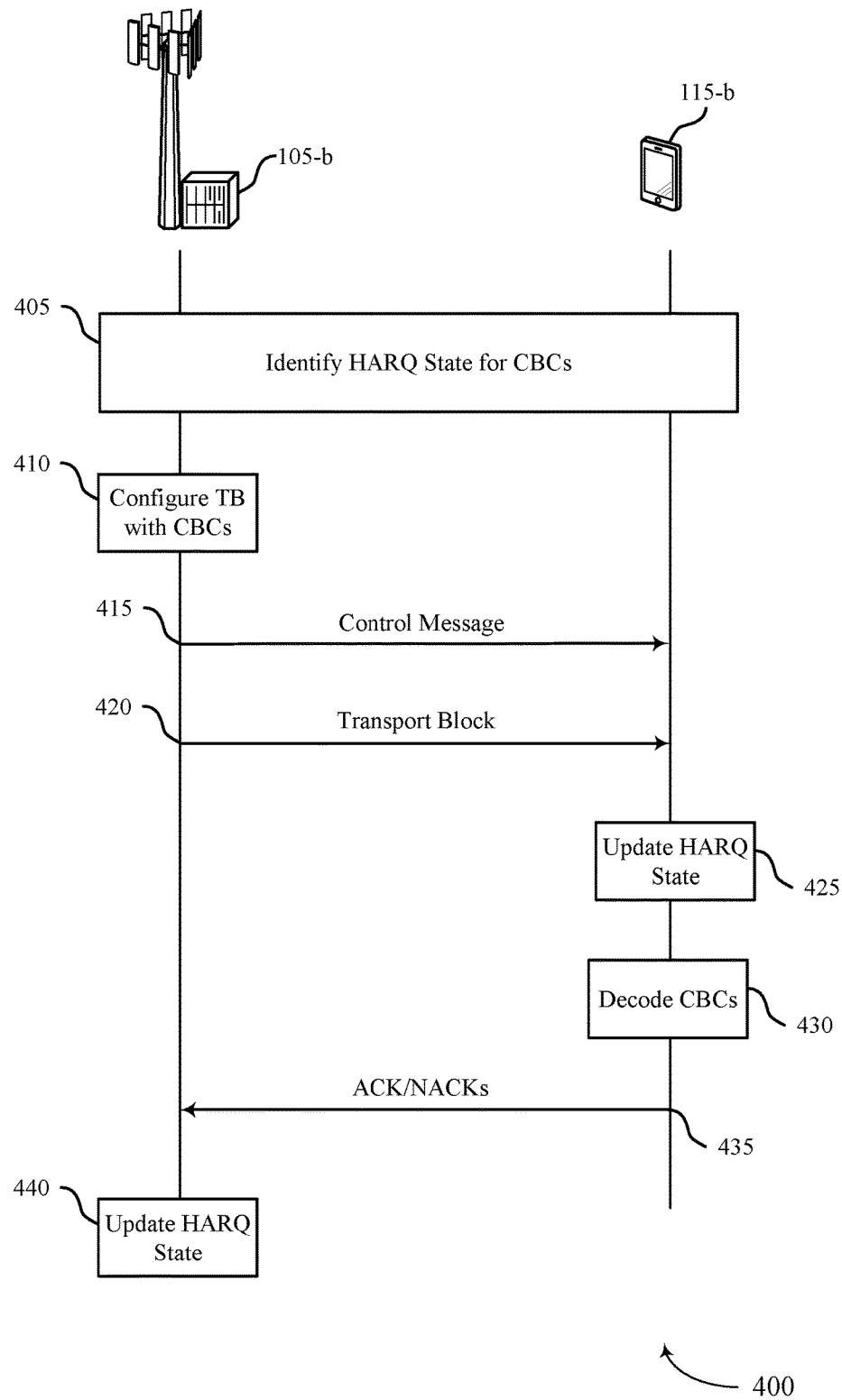
FIG. 4 illustrates an example of a process flow for CBC level HARQ in accordance with various aspects of the present disclosure.

FIG. 4 illustrates an example of a process flow 400 for CBC level HARQ in accordance with various aspects of the present disclosure. Process flow 400 may include a UE 115-b, which may be an example of a UE 115 described above with reference to FIGS. 1-3. Process flow 400 may also include a base station 105-b, which may be an example of a base station 105 described above with reference to FIGS. 1-3. Although described in reference to a base station 105 and UE 115, the steps of process flow 400 may be performed by any set of wireless devices communicating with CBC level HARQ.

At step 405, base station 105-b and UE 115 may identify a HARQ state for one or more CBCs. In some cases, base station 105-b and UE 115-b may store the HARQ state in a memory buffer.

At step 410, base station 105-b may identify a redundancy version of a number of CBCs in preparation for transmitting a transport block to UE 115-b. For example, base station 105-b may identify a redundancy version of a first CBC for transmission during a transmission time interval (TTI). Additionally, the base station 105-b may identify a version of a second CBC for transmission during the TTI. Base station 105-b may then configure a transport block for transmission over PDSCH to UE 115-b. In some cases, base station 105-b may configure the transport block based on a set of redundancy version segments, and each redundancy version segment may include a subset of CBCs having a same redundancy version.

At step 415, base station 105-b may transmit (and UE 115-b may receive) a control message indicating which redundancy version segments are included in the transport block. In some examples, the control message includes an indication of a redundancy version associated with each CBC included in the transport block. In some examples, the indication includes four (4) bits corresponding to the redundancy version segments. The control message may also include an ACK/NACK failure indicator. In some instances, the ACK/NACK failure indicator may be based on whether an ACK/NACK response was received for a previously transmitted CBC.

At step 420, base station 105-b may transmit (and UE 115-b may receive) a transport block including the redundancy version of the first CBC and the version of the second CBC. In some examples, the transmitted transport block comprises at least one CRC field. The version of the second CBC may include a redundancy version or a new version of the second CBC.

At step 425, UE 115-b may decode the control message and update (or refrain from updating) a HARQ state based on the information in the control message—e.g., based on a bit mask corresponding to the included RV segments and the ACK/NACK failure indicator.

At step 430, UE 115-b may decode the first and second CBCs. UE 115-b may perform a CRC for the received code blocks. UE 115-b may determine ACK/NACKs for the individual CBCs—e.g., based on the success of the CRCs.

At step 435, UE 115-b may transmit (and base station 105-b may receive) ACK/NACKs for the first and second CBCs, and any additional CBCs.

At step 440, base station 105-b may update the HARQ state based on the ACK/NACKs. In some cases, base station 105-b may determine that an ACK/NACK response has not been received for the set of transmitted CBCs. Accordingly, base station 105-b may refrain from updating the HARQ state based on the determination.

Figure 5:
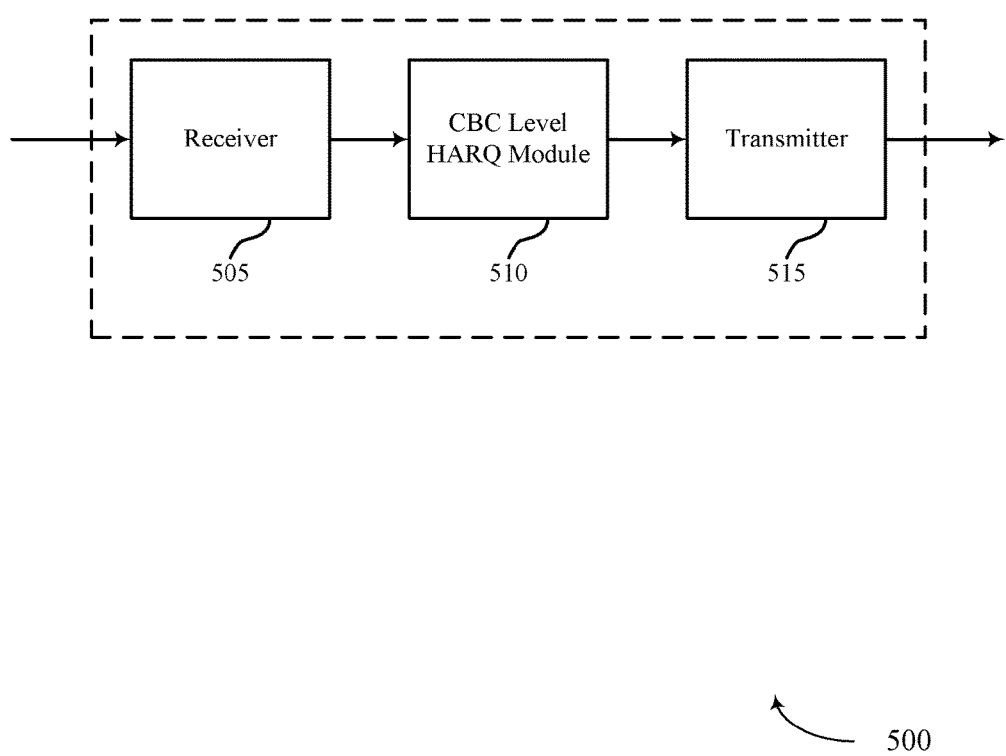
FIG. 5 shows a block diagram of a device configured for CBC level HARQ in accordance with various aspects of the present disclosure.

FIG. 5 shows a block diagram of a wireless device 500 configured for CBC level HARQ in accordance with various aspects of the present disclosure. Wireless device 500 may be an example of aspects of a UE 115 or a base station 105 described with reference to FIGS. 1-4. Wireless device 500 may include a receiver 505, a CBC level HARQ module 510, or a transmitter 515. Wireless device 500 may also include a processor. Each of these components may be in communication with one another.

The receiver 505 may receive information such as packets, user data, or control information associated with various information channels (e.g., control channels, data channels, and information related to CBC level HARQ, etc.). Information may be passed on to the CBC level HARQ module 510, and to other components of wireless device 500. In some examples, the receiver 505 may receive a transport block including the redundancy version of the first CBC and the version of the second CBC during the TTI. In some examples, the receiver 505 may receive a control message for the TTI including an indication of which redundancy version segments are included in the transport block. In some examples, the receiver 505 (of a transmitting device) may receive an ACK/NACK response for the set of transmitted CBCs.

The CBC level HARQ module 510 may identify a redundancy version of a first CBC for transmission during a TTI and may identify a version of a second CBC for transmission during the TTI. In some examples, the CBC level HARQ module 510, in combination with, e.g., the transmitter 515, may transmit a transport block that includes the redundancy version of the first CBC and the version of the second CBC during the TTI. In other examples, the CBC level HARQ module 510, in combination with, e.g., the receiver 505, may receive a transport block that includes the redundancy version of the first CBC and the version of the second CBC during the TTI.

The transmitter 515 may transmit signals received from other components of wireless device 500. In some examples, the transmitter 515 may be collocated with the receiver 505 in a transceiver module. The transmitter 515 may include a single antenna, or it may include a several antennas.

Figure 6:
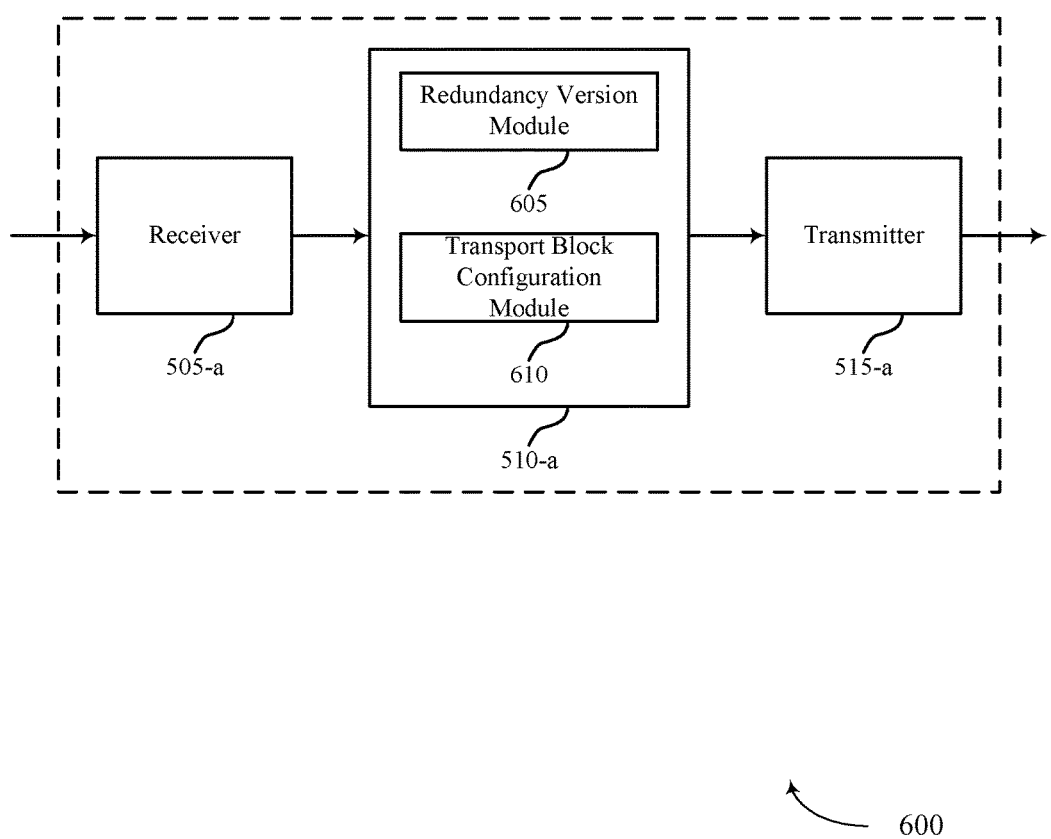
FIG. 6 shows a block diagram of a device configured for CBC level HARQ in accordance with various aspects of the present disclosure.

FIG. 6 shows a block diagram of a wireless device 600 for CBC level HARQ in accordance with various aspects of the present disclosure. Wireless device 600 may be an example of aspects of a wireless device 500 or a UE 115 or a base station 105 described with reference to FIGS. 1-5. Wireless device 600 may include a receiver 505-a, a CBC level HARQ module 510-a, or a transmitter 515-a. Wireless device 600 may also include a processor. Each of these components may be in communication with one another. The CBC level HARQ module 510-a may also include a redundancy version module 605, and a transport block configuration module 610.

The receiver 505-a may receive information which may be passed on to CBC level HARQ module 510-a, and to other components of wireless device 600. The CBC level HARQ module 510-a may perform the operations described above with reference to FIG. 5. The transmitter 515-a may transmit signals received from other components of wireless device 600.

The redundancy version module 605 may identify a redundancy version of a first CBC for transmission during a TTI, as described above with reference to FIGS. 2-4. The redundancy version module 605 may also identify a version of a second CBC for transmission during the TTI. In some examples, the version of the second CBC transmitted during the TTI includes a redundancy version or a new version of the second CBC. Additionally or alternatively, the redundancy version module 605 may identify a redundancy version of a first CBC for reception during a TTI. The redundancy version module 605 may also identify a version of a second CBC for reception during the TTI. In some examples, the version of the second CBC transmitted during the TTI comprises a redundancy version or a new version of the second CBC.

The transport block configuration module 610 may transmit a transport block that includes the redundancy version of the first CBC and the version of the second CBC during the TTI, as described above with reference to FIGS. 2-4. The transport block configuration module 610 may also configure the transport block using several redundancy version segments, such that each redundancy version segment may include a subset of CBCs having a same redundancy version. In some examples, the transport block may thus be based on a set of redundancy version segments, each redundancy version segment of the set including one or more CBCs having a same redundancy version.

Figure 7:
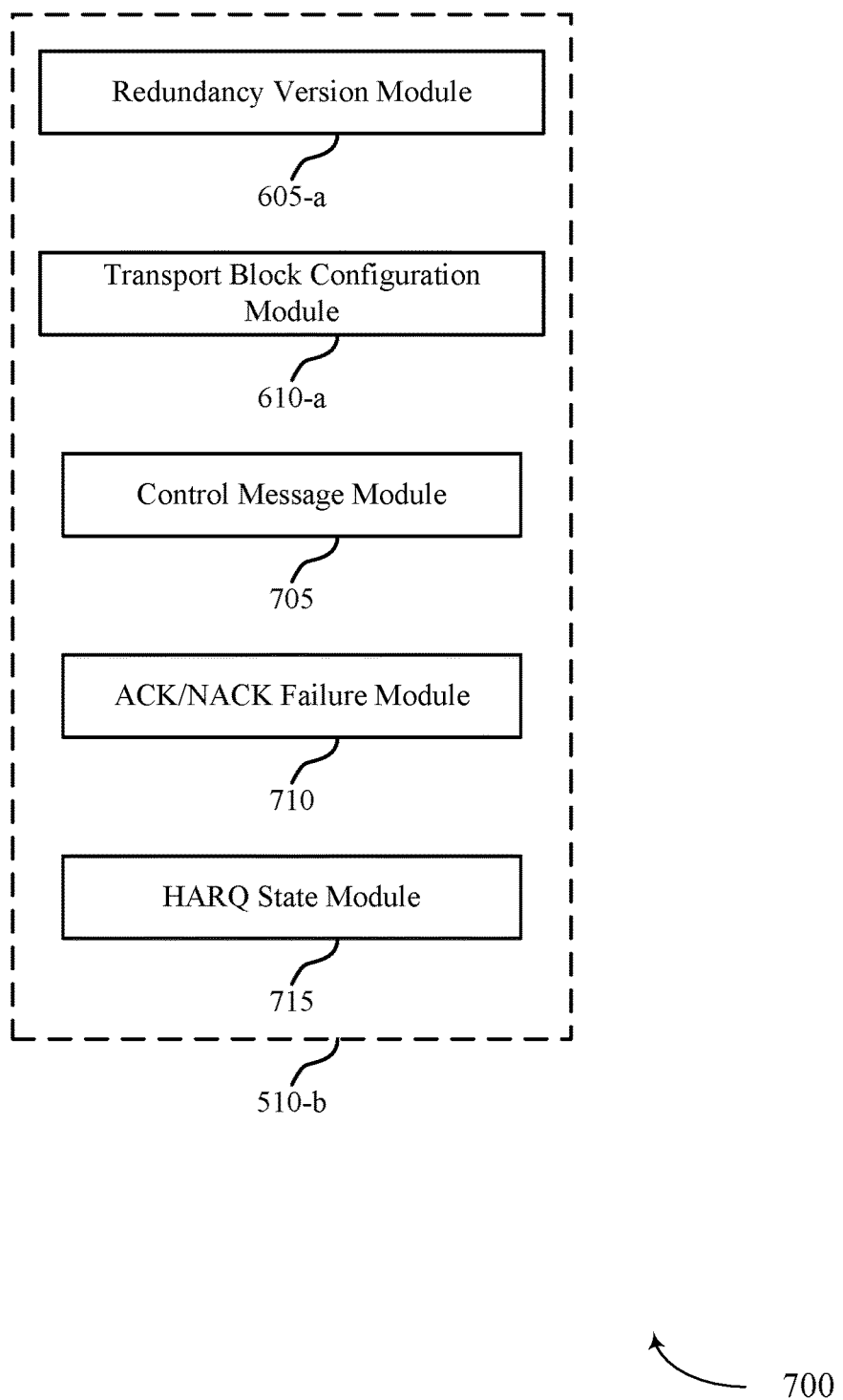
FIG. 7 shows a block diagram of a CBC level HARQ module configured for CBC level HARQ in accordance with various aspects of the present disclosure.

FIG. 7 shows a block diagram 700 of a CBC level HARQ module 510-*b* which may be a component of a wireless device 500 or a wireless device 600 for CBC level HARQ in accordance with various aspects of the present disclosure. The CBC level HARQ module 510-*b* may be an example of aspects of a CBC level HARQ module 510 described with reference to FIGS. 5-6. The CBC level HARQ module 510-*b* may include a redundancy version module 605-*a*, and a transport block configuration module 610-*a*. Each of these modules may perform the functions described above with reference to FIG. 6. The CBC level HARQ module 510-*b* may also include a control message module 705, an ACK/NACK failure module 710, and a HARQ state module 715. The various modules of CBC level HARQ module 510-*b* may be in communication with one another.

The control message module 705 may transmit a control message for the TTI that includes an indication of which redundancy version segments are included in the transport block, as described above with reference to FIGS. 2-4. In some examples, the control message for the TTI may include an indication of a redundancy version associated with each CBC included in the transport block. In some examples, the indication includes four bits corresponding to a combination of redundancy version segments. The control message may also include an ACK/NACK failure indicator.

The ACK/NACK failure module 710 may configure a control message to include an ACK/NACK failure indicator, as described above with reference to FIGS. 2-4. In some examples, the ACK/NACK failure module 710 may also determine whether an ACK or a NACK was received for a transmitted CBC, and the ACK/NACK failure indicator may be configured according to, and may thus be based on, the determination.

The HARQ state module 715 may store a HARQ state corresponding to several transmitted CBCs, as described above with reference to FIGS. 2-4. The HARQ state module 715 may also update the HARQ state based on the ACK/NACK response. The HARQ state module 715 may, for instance, determine that an ACK/NACK response has not been received for the transmitted CBCs. The HARQ state module 715 may also refrain from updating the HARQ state based on the determination. In some cases, the HARQ state module 715 may update the HARQ state based on processing a CRC associated with one or more received CBCs.

The components of wireless device 500, wireless device 600, or CBC level HARQ module 510-*b* may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
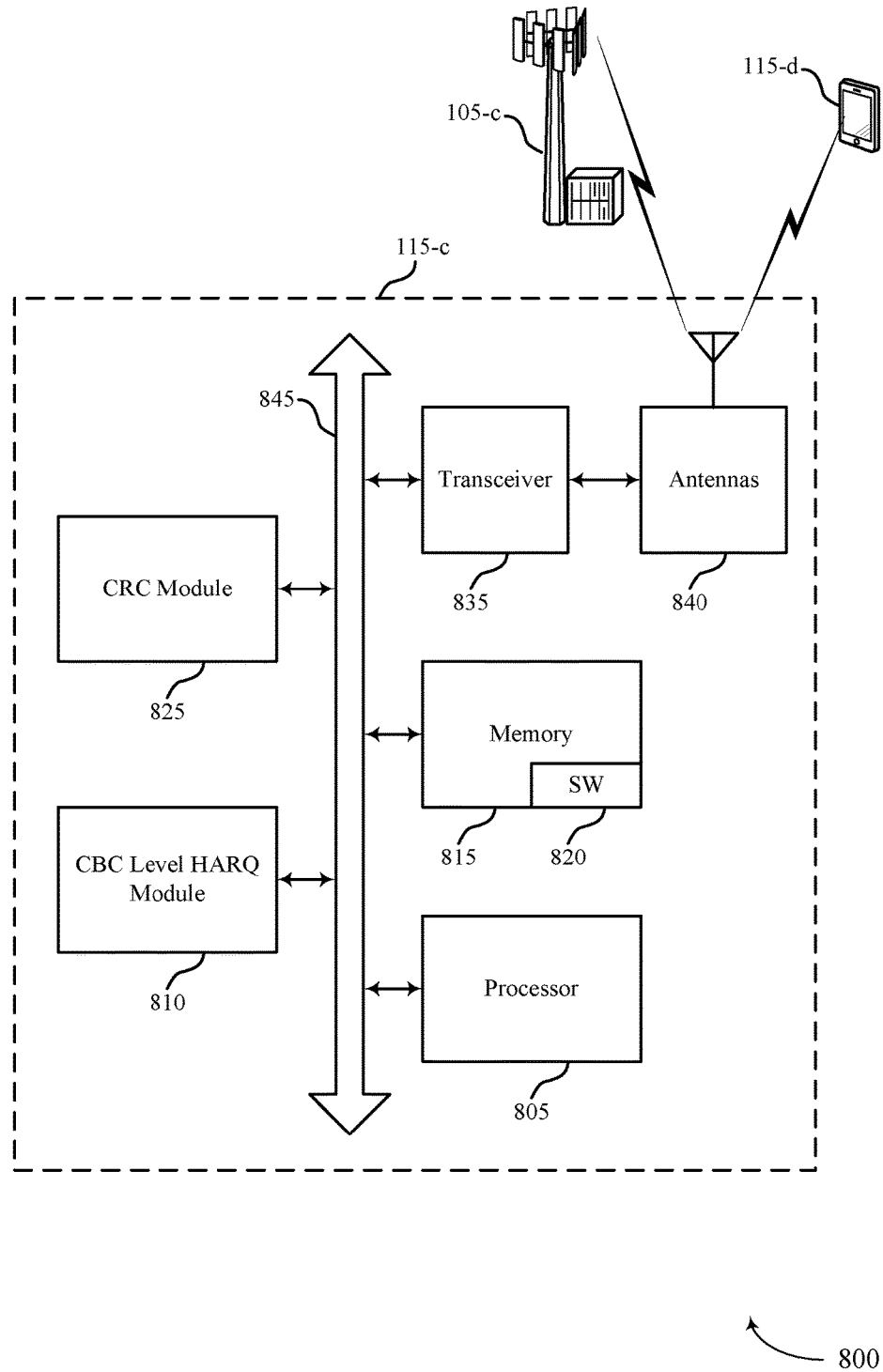
FIG. 8 illustrates a block diagram of a system including a UE configured for CBC level HARQ in accordance with various aspects of the present disclosure.

FIG. 8 shows a diagram of a system 800 including a UE configured for CBC level HARQ in accordance with various aspects of the present disclosure. System 800 may include UE 115-*c*, which may be an example of a wireless device 500, or a wireless device 600 described above with reference to FIGS. 1-7. UE 115-*c* may include a CBC level HARQ module 810, which may be an example of a CBC level HARQ module 510 described with reference to FIGS. 5-7. In some examples, UE 115-*c* may include a CRC module 825. UE 115-*c* may also include components for bi-directional voice and data communications including components for transmitting communications and components for receiving communications. For example, UE 115-*c* may communicate bi-directionally with base station 105-*c* or UE 115-*d*.

The CRC module 825 may perform a CRC on received code blocks to determine whether each code block has been correctly received. In some cases, a transmitted or received transport block may include at least one CRC field—e.g., associated with code blocks, CBCs, or transport blocks—as described above with reference to FIGS. 2-4.

UE 115-*c* may also include a processor 805, and memory 815 (including software (SW) 820), a transceiver module 835, and one or more antenna(s) 840, each of which may communicate, directly or indirectly, with one another (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antenna(s) 840 for transmission, and to demodulate packets received from the antenna(s) 840. While UE 115-*e* may include a single antenna 840, UE 115-*c* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., CBC level HARQ, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
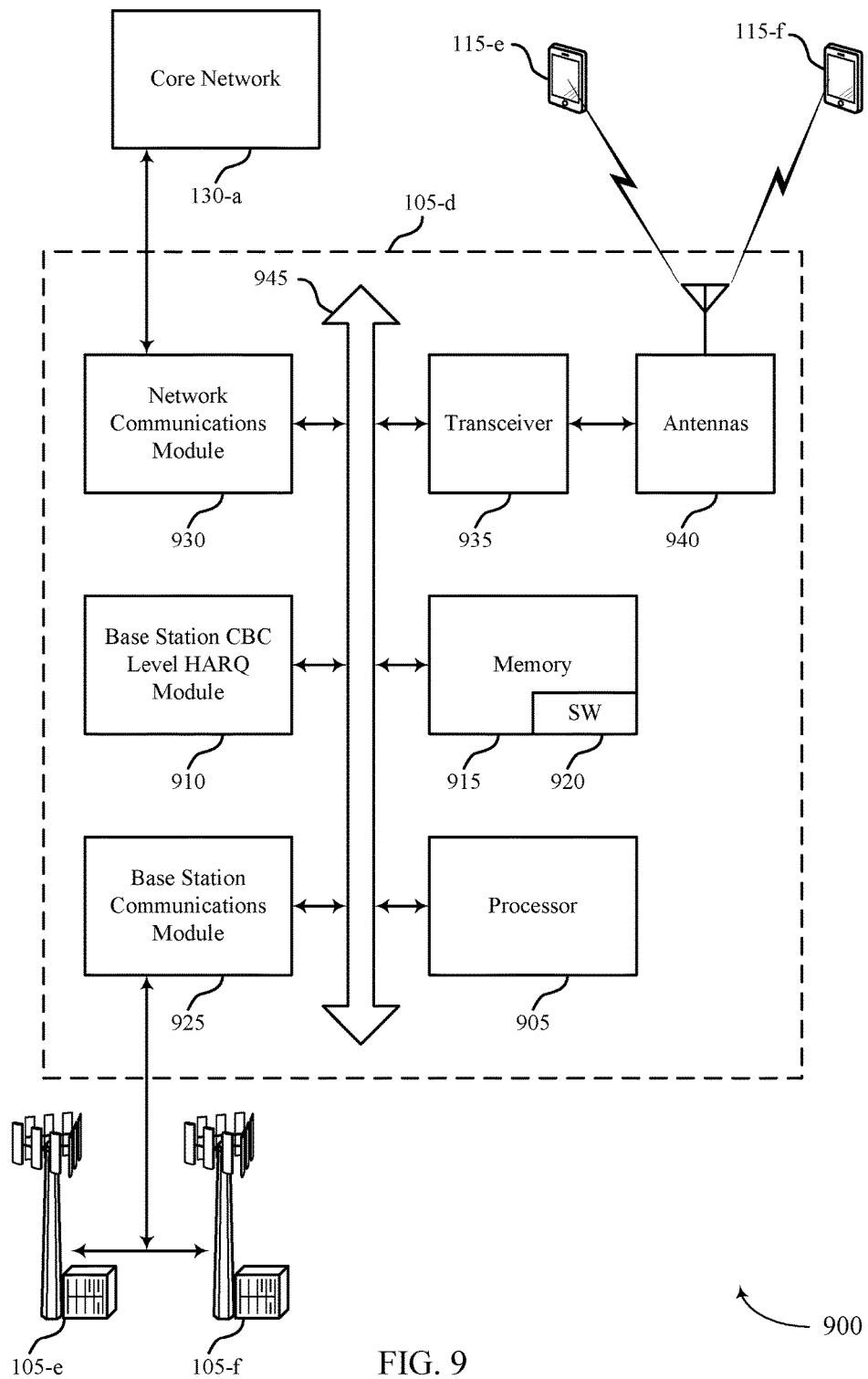
FIG. 9 illustrates a block diagram of a system including a base station configured for CBC level HARQ in accordance with various aspects of the present disclosure.

FIG. 9 shows a diagram of a system 900 including a base station 105 configured for CBC level HARQ in accordance with various aspects of the present disclosure. System 900 may include base station 105-*d*, which may be an example of a wireless device 600, a CBC level HARQ module 510-*b*, or a base station 105 described above with reference to FIGS. 1-8. Base station 105-*d* may include a base station CBC level HARQ module 910, which may be an example of a CBC level HARQ module 510 described with reference to FIGS. 5-7. Base station 105-*d* may also include components for bi-directional voice and data communications including components for transmitting communications and components for receiving communications. For example, base station 105-*d* may communicate bi-directionally with UE 115-*e* or UE 115-*f*.

In some cases, base station 105-*d* may have one or more wired backhaul links. Base station 105-*d* may have a wired backhaul link (e.g., 51 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications module 925. In some examples, base station communications module 925 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 930.

The base station 105-*d* may include a processor 905, memory 915 (including software (SW) 920), transceiver modules 935, and antenna(s) 940, which each may be in communication, directly or indirectly, with one another (e.g., over bus system 945). The transceiver modules 935 may be configured to communicate bi-directionally, via the antenna(s) 940, with the UEs 115, which may be multi-mode devices. The transceiver module 935 (or other components of the base station 105-*d*) may also be configured to communicate bi-directionally, via the antennas 940, with one or more other base stations (not shown). The transceiver module 935 may include a modem configured to modulate the packets and provide the modulated packets to the antennas 940 for transmission, and to demodulate packets received from the antennas 940. The base station 105-*d* may include multiple transceiver modules 935, each with one or more associated antennas 940. The transceiver module may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., CBC level HARQ, selecting coverage enhancement techniques, call processing, database management, message routing, etc.). Alternatively, the software code 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. The communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

Figure 10:
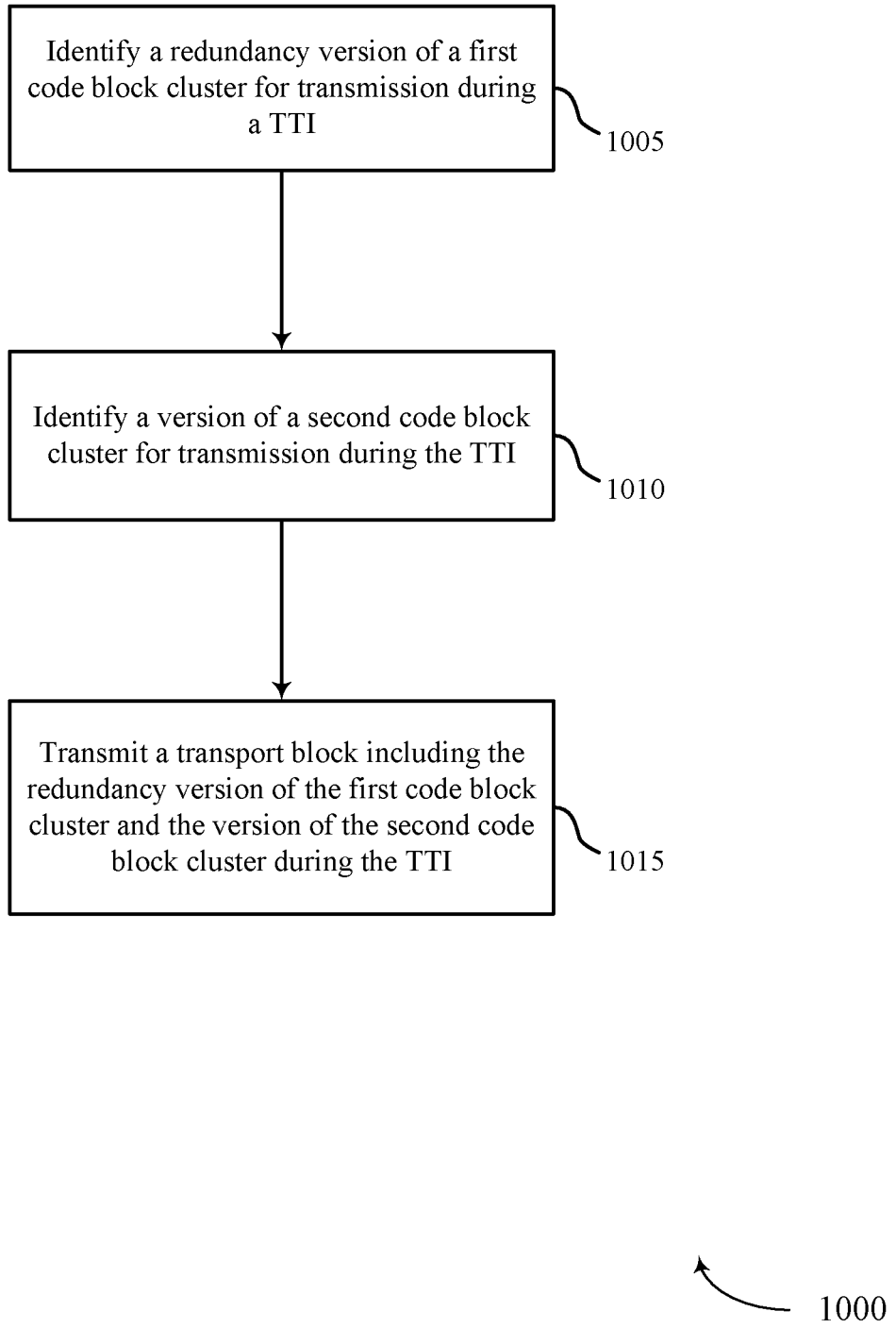
FIG. 10 shows a flowchart illustrating a method for CBC level HARQ in accordance with various aspects of the present disclosure.

FIG. 10 shows a flowchart illustrating a method 1000 for CBC level HARQ in accordance with various aspects of the present disclosure. The operations of method 1000 may be implemented by a wireless device, including a UE 115 or a base station 105, or its components, which may include wireless device 500 or wireless device 600, as described with reference to FIGS. 1-9. For example, the operations of method 1000 may be performed by the CBC level HARQ module 510 as described with reference to FIGS. 5-8. In some examples, the wireless device may execute a set of codes to control the functional elements to perform the functions described below. Additionally or alternatively, the wireless device may perform aspects the functions described below using special-purpose hardware.

At block 1005, the wireless device may identify a redundancy version of a first CBC for transmission during a TTI as described above with reference to FIGS. 2-4. In certain examples, the operations of block 1005 may be performed by the redundancy version module 605 as described above with reference to FIG. 6.

At block 1010, the wireless device may identify a version of a second CBC for transmission during the TTI as described above with reference to FIGS. 2-4. In certain examples, the operations of block 1010 may be performed by the redundancy version module 605 as described above with reference to FIG. 6.

At block 1015, the wireless device may transmit a transport block that includes the redundancy version of the first CBC and the version of the second CBC during the TTI as described above with reference to FIGS. 2-4. In certain examples, the operations of block 1015 may be performed by the transport block configuration module 610 as described above with reference to FIG. 6.

Figure 11:
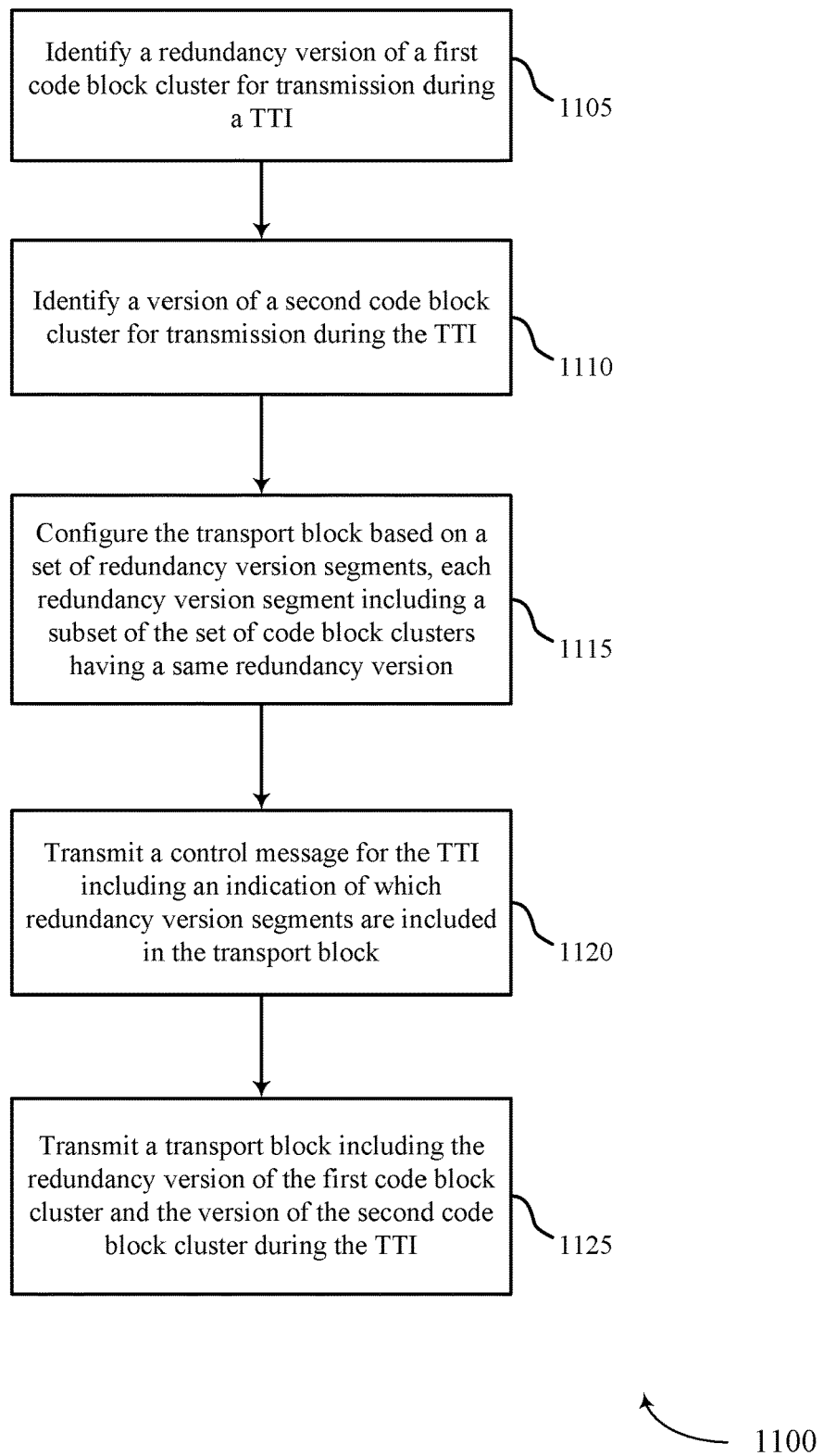
FIG. 11 shows a flowchart illustrating a method for CBC level HARQ in accordance with various aspects of the present disclosure.

FIG. 11 shows a flowchart illustrating a method 1100 for CBC level HARQ in accordance with various aspects of the present disclosure. The operations of method 1100 may be implemented by a wireless device, including a UE 115 or a base station 105, or its components, which may include wireless device 500 or wireless device 600, as described with reference to FIGS. 1-9. For example, the operations of method 1100 may be performed by the CBC level HARQ module 510 as described with reference to FIGS. 5-8. In some examples, the wireless device may execute a set of codes to control the functional elements of the device to perform the functions described below. Additionally or alternatively, the wireless device may perform aspects the functions described below using special-purpose hardware. The method 1100 may also incorporate aspects of method 1000 of FIG. 10.

At block 1105, the wireless device may identify a redundancy version of a first CBC for transmission during a TTI as described above with reference to FIGS. 2-4. In certain examples, the operations of block 1105 may be performed by the redundancy version module 605 as described above with reference to FIG. 6.

At block 1110, the wireless device may identify a version of a second CBC for transmission during the TTI as described above with reference to FIGS. 2-4. In certain examples, the operations of block 1110 may be performed by the redundancy version module 605 as described above with reference to FIG. 6.

At block 1115, the wireless device may configure a transport block based at least in part on a set of redundancy version segments, each redundancy version segment of the set including a subset of CBCs having a same redundancy version as described above with reference to FIGS. 2-4. In certain examples, the operations of block 1115 may be performed by the transport block configuration module 610 as described above with reference to FIG. 6.

At block 1120, the wireless device may transmit a control message for the TTI that includes an indication of which redundancy version segments are included in the transport block as described above with reference to FIGS. 2-4. In certain examples, the operations of block 1120 may be performed by the control message module 705 as described above with reference to FIG. 7.

At block 1125, the wireless device may transmit the transport block that includes the redundancy version of the first CBC and the version of the second CBC during the TTI as described above with reference to FIGS. 2-4. In certain examples, the operations of block 1125 may be performed by the transport block configuration module 610 as described above with reference to FIG. 6.

Figure 12:
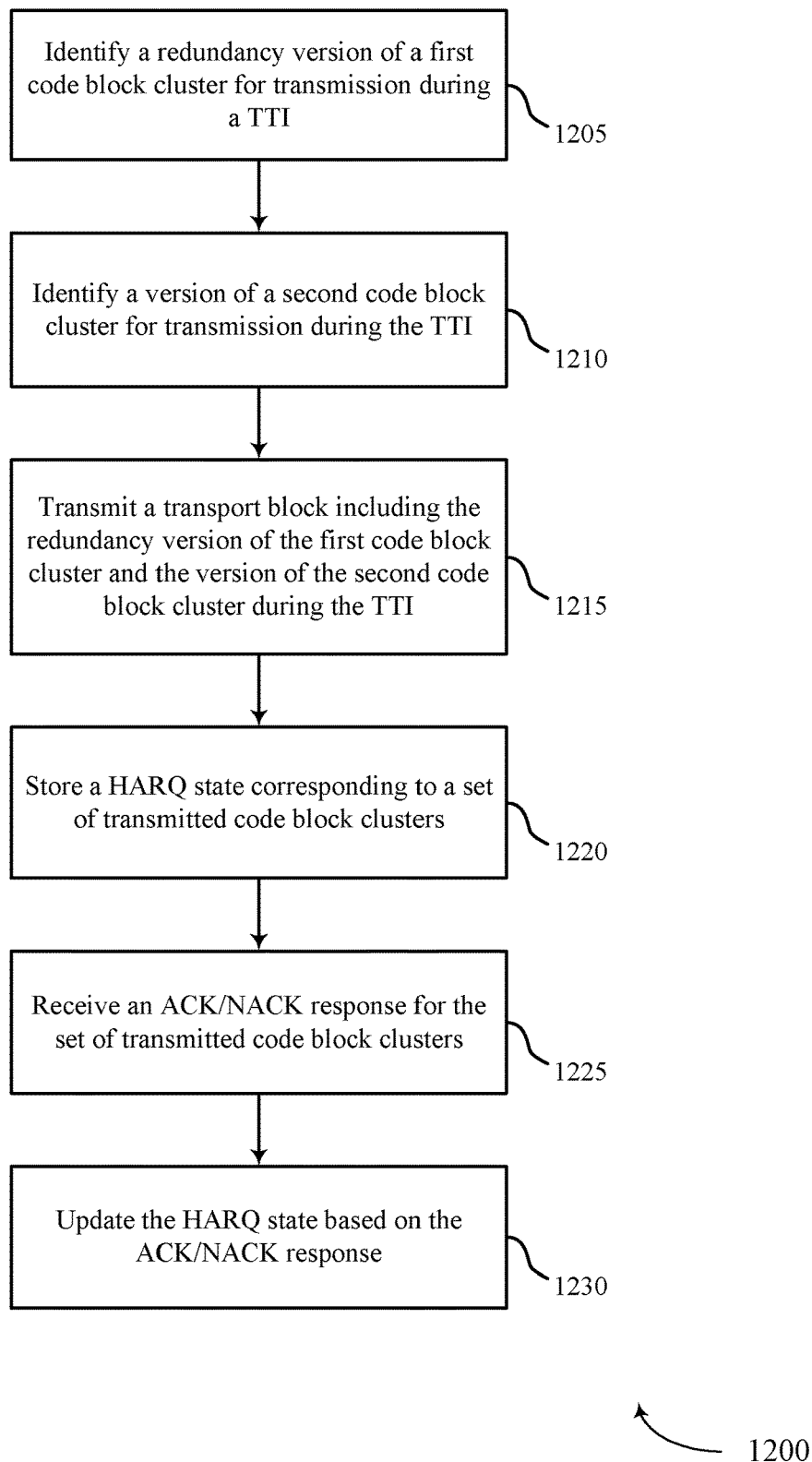
FIG. 12 shows a flowchart illustrating a method for CBC level HARQ in accordance with various aspects of the present disclosure.

FIG. 12 shows a flowchart illustrating a method 1200 for CBC level HARQ in accordance with various aspects of the present disclosure. The operations of method 1200 may be implemented by a wireless device, including a UE 115 or a base station 105, or its components, which may include wireless device 500 or wireless device 600, as described with reference to FIGS. 1-9. For example, the operations of method 1200 may be performed by the CBC level HARQ module 510 as described with reference to FIGS. 5-8. In some examples, a wireless device may execute a set of codes to control the functional elements to perform the functions described below. Additionally or alternatively, the wireless device may perform aspects the functions described below using special-purpose hardware. The method 1200 may also incorporate aspects of methods 1000 or 1100 of FIGS. 10 and 11.

At block 1205, the wireless device may identify a redundancy version of a first CBC for transmission during a TTI as described above with reference to FIGS. 2-4. In certain examples, the operations of block 1205 may be performed by the redundancy version module 605 as described above with reference to FIG. 6.

At block 1210, the wireless device may identify a version of a second CBC for transmission during the TTI as described above with reference to FIGS. 2-4. In certain examples, the operations of block 1210 may be performed by the redundancy version module 605 as described above with reference to FIG. 6.

At block 1215, the wireless device may transmit a transport block that includes the redundancy version of the first CBC and the version of the second CBC during the TTI as described above with reference to FIGS. 2-4. In certain examples, the operations of block 1215 may be performed by the transport block configuration module 610 as described above with reference to FIG. 6.

At block 1220, the wireless device may store a HARQ state corresponding to a set of transmitted CBCs as described above with reference to FIGS. 2-4. In certain examples, the operations of block 1220 may be performed by the HARQ state module 715 as described above with reference to FIG. 7.

At block 1225, the wireless device may receive an ACK/NACK response for the set of transmitted CBCs as described above with reference to FIGS. 2-4. In certain examples, the operations of block 1225 may be performed by the receiver 505 as described above with reference to FIG. 5.

At block 1230, the wireless device may update the HARQ state based at least in part on the ACK/NACK response as described above with reference to FIGS. 2-4. In certain examples, the operations of block 1230 may be performed by the HARQ state module 715 as described above with reference to FIG. 7.

Figure 13:
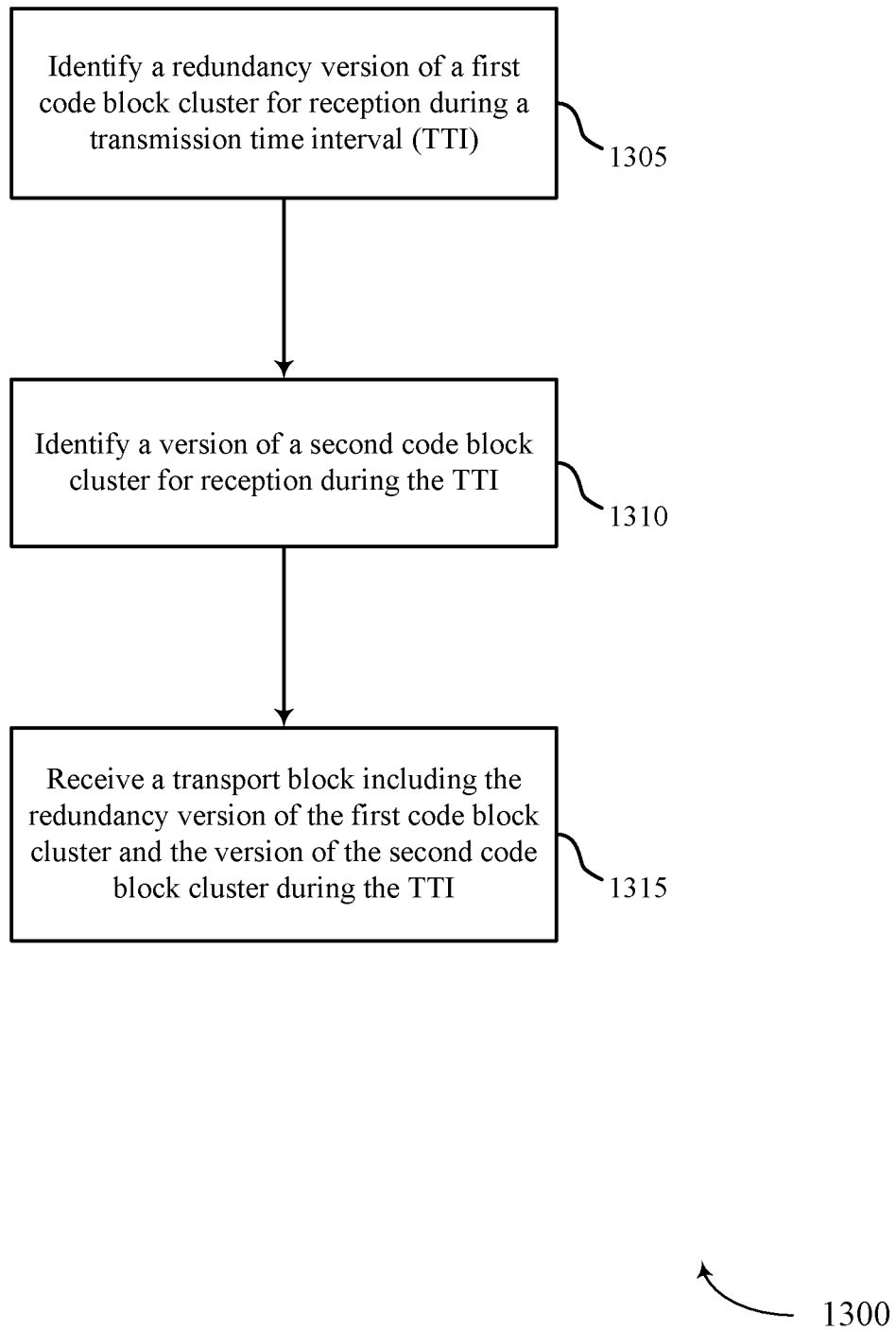
FIG. 13 shows a flowchart illustrating a method for CBC level HARQ in accordance with various aspects of the present disclosure.

FIG. 13 shows a flowchart illustrating a method 1300 for CBC level HARQ in accordance with various aspects of the present disclosure. The operations of method 1300 may be implemented by a wireless device, including a UE 115 or a base station 105, or its components, which may include wireless device 500 or wireless device 600, as described with reference to FIGS. 1-9. For example, the operations of method 1300 may be performed by the CBC level HARQ module 510 as described with reference to FIGS. 5-8. In some examples, a wireless device may execute a set of codes to control the functional elements to perform the functions described below. Additionally or alternatively, the wireless device may perform aspects the functions described below using special-purpose hardware.

At block 1305, the wireless device may identify a redundancy version of a first CBC for reception during a TTI as described above with reference to FIGS. 2-4. In certain examples, the operations of block 1305 may be performed by the redundancy version module 605 as described above with reference to FIG. 6.

At block 1310, the wireless device may identify a version of a second CBC for reception during the TTI as described above with reference to FIGS. 2-4. In certain examples, the operations of block 1310 may be performed by the redundancy version module 605 as described above with reference to FIG. 6.

At block 1315, the wireless device may receive a transport block that includes the redundancy version of the first CBC and the version of the second CBC during the TTI as described above with reference to FIGS. 2-4. In certain examples, the operations of block 1315 may be performed by the receiver 505 as described above with reference to FIG. 5.

Figure 14:
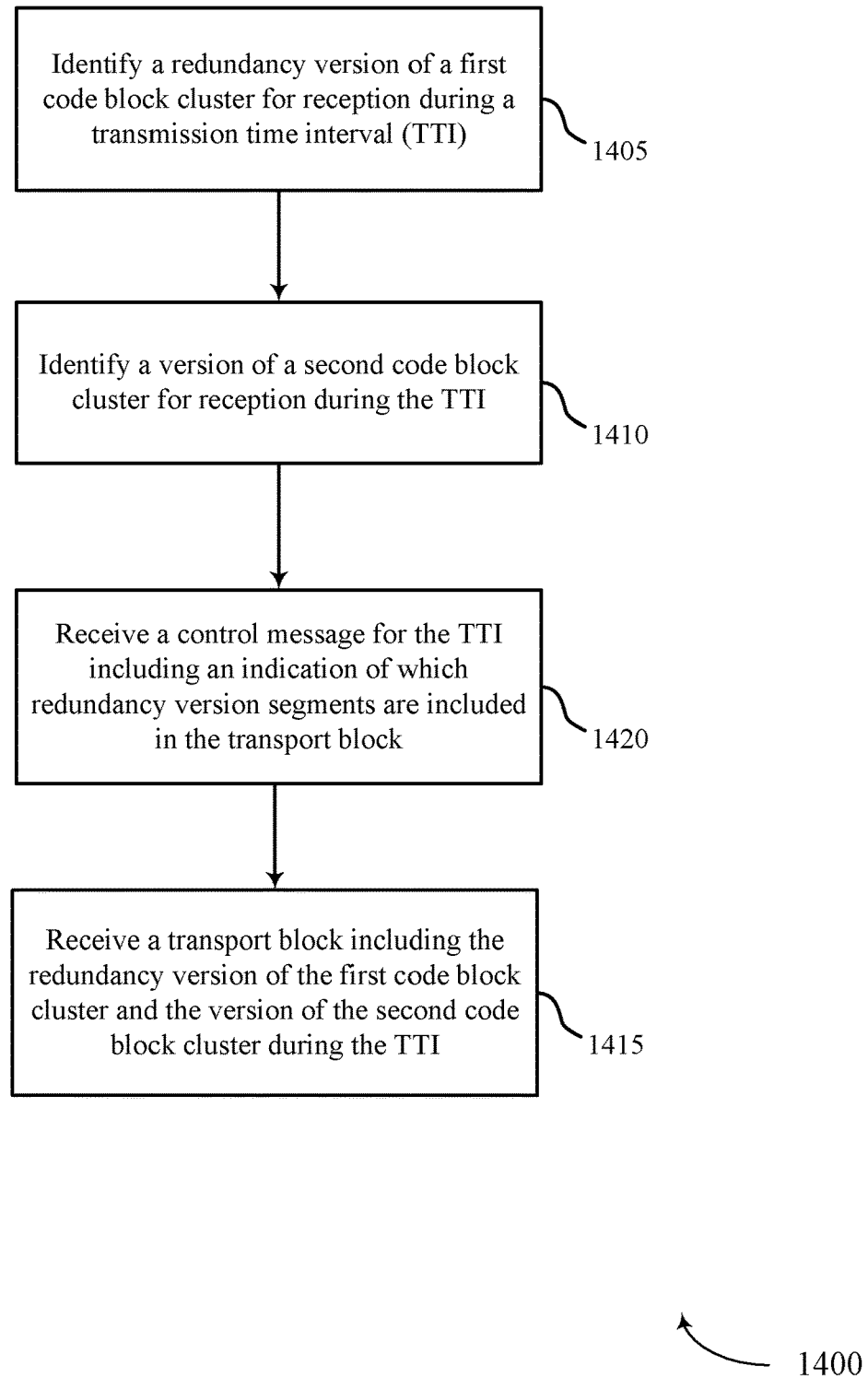
FIG. 14 shows a flowchart illustrating a method for CBC level HARQ in accordance with various aspects of the present disclosure.

FIG. 14 shows a flowchart illustrating a method 1400 for CBC level HARQ in accordance with various aspects of the present disclosure. The operations of method 1400 may be implemented by a wireless device, including a UE 115 or a base station 105, or its components, which may include wireless device 500 or wireless device 600, as described with reference to FIGS. 1-9. For example, the operations of method 1400 may be performed by the CBC level HARQ module 510 as described with reference to FIGS. 5-8. In some examples, a wireless device may execute a set of codes to control the functional elements of the device to perform the functions described below. Additionally or alternatively, the wireless device may perform aspects the functions described below using special-purpose hardware. The method 1400 may also incorporate aspects of method 1300 of FIG. 13.

At block 1405, the wireless device may identify a redundancy version of a first CBC for reception during a TTI as described above with reference to FIGS. 2-4. In certain examples, the operations of block 1405 may be performed by the redundancy version module 605 as described above with reference to FIG. 6.

At block 1410, the wireless device may identify a version of a second CBC for reception during the TTI as described above with reference to FIGS. 2-4. In certain examples, the operations of block 1410 may be performed by the redundancy version module 605 as described above with reference to FIG. 6.

At block 1415, the wireless device may receive a control message for the TTI that includes an indication of which redundancy version segments are included in the transport block as described above with reference to FIGS. 2-4. In some examples, block 1415 may be performed by the receiver 505 as described above with reference to FIG. 5.

At block 1420, the wireless device may receive a transport block that includes the redundancy version of the first CBC and the version of the second CBC during the TTI as described above with reference to FIGS. 2-4. In some cases, the transport block is based at least in part on a set of redundancy version segments, each redundancy version segment of the set including one or more CBCs having a same redundancy version. In certain examples, the operations of block 1420 may be performed by the receiver 505 as described above with reference to FIG. 5.

Figure 15:
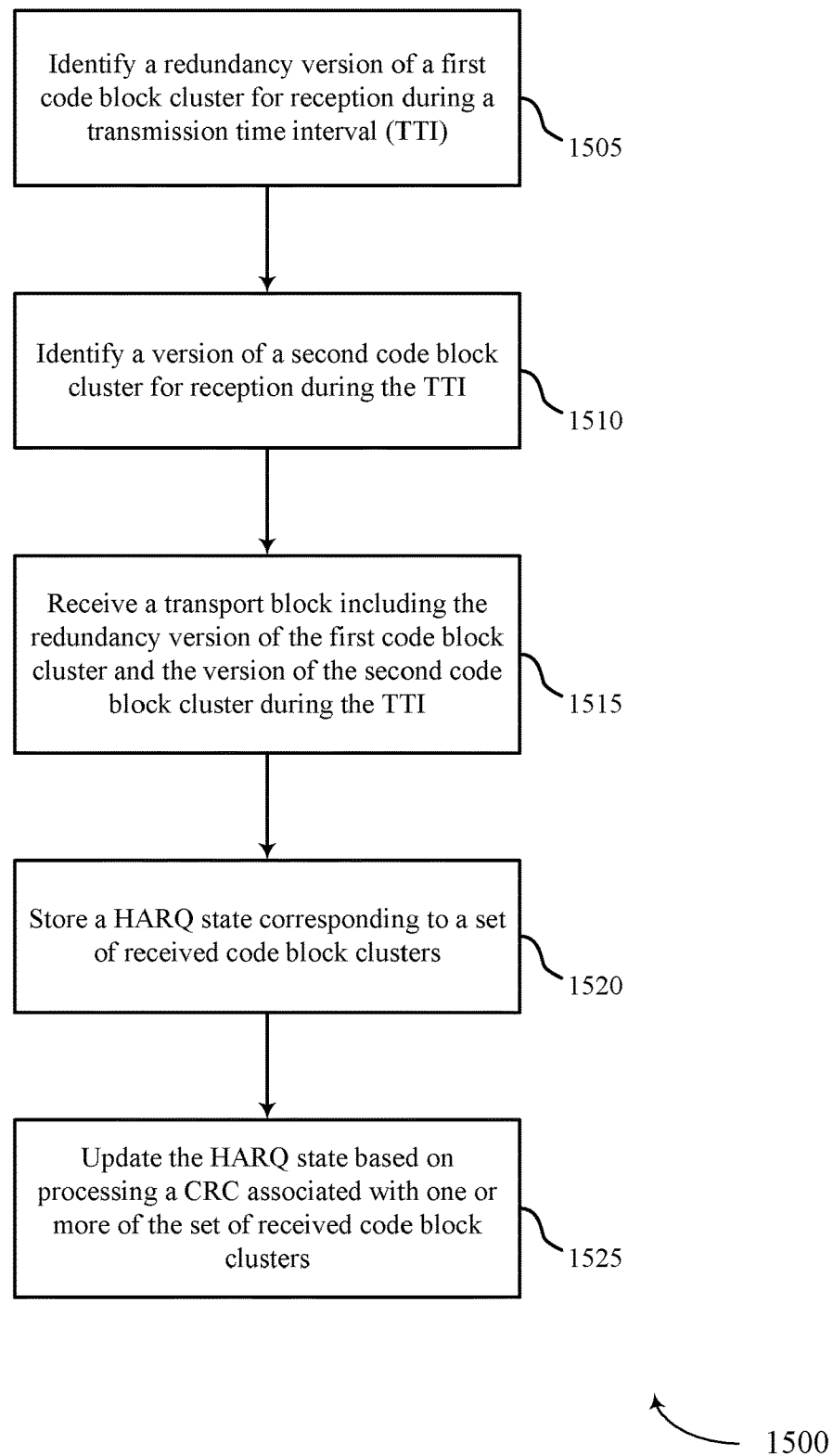
FIG. 15 shows a flowchart illustrating a method for CBC level HARQ in accordance with various aspects of the present disclosure.

FIG. 15 shows a flowchart illustrating a method 1500 for CBC level HARQ in accordance with various aspects of the present disclosure. The operations of method 1500 may be implemented by a wireless device, including a UE 115 or a base station 105, or its components, which may include wireless device 500 or wireless device 600, as described with reference to FIGS. 1-9. For example, the operations of method 1500 may be performed by the CBC level HARQ module 510 as described with reference to FIGS. 5-8. In some examples, a wireless device may execute a set of codes to control the functional elements of the device to perform the functions described below. Additionally or alternatively, the wireless device may perform aspects the functions described below using special-purpose hardware. The method 1500 may also incorporate aspects of methods 1300 or 1400 of FIGS. 13 and 14.

At block 1505, the wireless device may identify a redundancy version of a first CBC for reception during a TTI as described above with reference to FIGS. 2-4. In certain examples, the operations of block 1505 may be performed by the redundancy version module 605 as described above with reference to FIG. 6.

At block 1510, the wireless device may identify a version of a second CBC for reception during the TTI as described above with reference to FIGS. 2-4. In certain examples, the operations of block 1510 may be performed by the redundancy version module 605 as described above with reference to FIG. 6.

At block 1515, the wireless device may receive a transport block that includes the redundancy version of the first CBC and the version of the second CBC during the TTI as described above with reference to FIGS. 2-4. In certain examples, the operations of block 1515 may be performed by the receiver 505 as described above with reference to FIG. 5.

At block 1520, the wireless device may store a HARQ state corresponding to a set of received CBCs as described above with reference to FIGS. 2-4. In certain examples, the operations of block 1520 may be performed by the HARQ state module 715 as described above with reference to FIG. 7.

At block 1525, the wireless device may update the HARQ state based at least in part on processing a CRC associated with one or more of the set of received CBCs as described above with reference to FIGS. 2-4. In certain examples, the operations of block 1525 may be performed by the HARQ state module 715 as described above with reference to FIG. 7.

Thus, methods 1000, 1100, 1200, 1300, 1400, and 1500 may provide for CBC level HARQ. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes example configurations and does not represent all the examples that may be implemented or that are within the scope of the claims. The term "exemplary," as may be used herein, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communication at a wireless device, comprising:
   identifying a first redundancy version of a first code block cluster (CBC) for transmission in a transport block during a transmission time interval (TTI);
   identifying a second redundancy version of a second CBC for transmission in the transport block during the TTI, wherein identifying the second redundancy version of the second CBC is based at least in part on a received negative-acknowledgement (NACK) for a first redundancy version for the second CBC of a previously transmitted transport block, wherein the second CBC is a portion of the previously transmitted transport block; and
   transmitting the transport block comprising the first redundancy version of the first CBC and the second redundancy version of the second CBC during the TTI.

2. The method of claim 1, further comprising:
   identifying a third CBC corresponding to new data in the transport block.

3. The method of claim 1, further comprising:
   configuring the transport block based at least in part on a set of redundancy version segments, each redundancy version segment of the set comprising a subset of CBCs having a same redundancy version.

4. The method of claim 3, further comprising:
   transmitting a control message for the TTI comprising an indication of which redundancy version segments are included in the transport block.

5. The method of claim 4, wherein the control message for the TTI comprises an indication of a redundancy version associated with each CBC included in the transport block.

6. The method of claim 4, wherein the control message further comprises an acknowledgement (ACK)/NACK failure indicator.

7. The method of claim 6, further comprising:
   determining whether an ACK or a NACK was received for a transmitted CBC, wherein the ACK/NACK failure indicator is based at least in part on the determination whether the ACK or NACK was received.

8. The method of claim 1, further comprising:
   storing hybrid automatic repeat request (HARQ) state information corresponding to a set of transmitted CBCs.

9. The method of claim 8, further comprising:
   receiving an ACK/NACK response for the set of transmitted CBCs; and
   updating the HARQ state information based at least in part on the ACK/NACK response.

10. The method of claim 8, further comprising:
    determining that an ACK/NACK response has not been received for the set of transmitted CBCs; and refraining from updating the HARQ state information based at least in part on the determination that the ACK/NACK response has not been received.

11. A method of communication at a wireless device, comprising:
identifying a first redundancy version of a first code block cluster (CBC) for reception in a transport block during a transmission time interval (TTI);
identifying a second redundancy version of a second CBC for reception in the transport block during the TTI, wherein identifying the second redundancy version of the second CBC is based at least in part on a transmitted negative-acknowledgement (NACK) for a first redundancy version for the second CBC of a previously received transport block, wherein the second CBC is a portion of the previously received transport block; and
receiving the transport block comprising the first redundancy version of the first CBC and the second redundancy version of the second CBC during the TTI.

12. The method of claim 11, further comprising:
identifying a third CBC corresponding to new data in the transport block.

13. The method of claim 11, wherein the transport block is based at least in part on a set of redundancy version segments, each redundancy version segment of the set comprising one or more CBCs having a same redundancy version.

14. The method of claim 13, further comprising:
receiving a control message for the TTI comprising an indication of which redundancy version segments are included in the transport block.

15. The method of claim 14, wherein the control message further comprises an acknowledgement (ACK)/NACK failure indicator.

16. The method of claim 11, further comprising:
storing hybrid automatic repeat request (HARQ) state information corresponding to a set of received CBCs.

17. The method of claim 16, further comprising:
updating the HARQ state information based at least in part on processing a cyclic redundancy check (CRC) associated with one or more of the set of received CBCs.

18. An apparatus for communication at a wireless device, comprising:
a processor;
memory in electronic communication with the processor; and
instructions stored in the memory;
wherein the instructions are executable by the processor to:
identify a first redundancy version of a first code block cluster (CBC) for transmission in a transport block during a transmission time interval (TTI);
identify a second redundancy version of a second CBC for transmission in the transport block during the TTI, wherein identifying the second redundancy version of the second CBC is based at least in part on a received negative-acknowledgement (NACK) for a first redundancy version for the second CBC of a previously transmitted transport block, wherein the second CBC is a portion of the previously transmitted transport block; and
transmit the transport block comprising the first redundancy version of the first CBC and the second redundancy version of the second CBC during the TTI.

19. The apparatus of claim 18, wherein the instructions are executable by the processor to:
identify a third CBC corresponding to new data in the transport block.

20. The apparatus of claim 18, wherein the instructions are executable by the processor to:
configure the transport block based at least in part on a set of redundancy version segments, each redundancy version segment of the set comprising a subset of CBCs having a same redundancy version.

21. The apparatus of claim 20, wherein the instructions are executable by the processor to:
transmit a control message for the TTI comprising an indication of which redundancy version segments are included in the transport block.

22. The apparatus of claim 21, wherein the control message for the TTI comprises an indication of a redundancy version associated with each CBC included in the transport block.

23. The apparatus of claim 21, wherein the indication comprises four bits corresponding to a combination of redundancy version segments.

24. The apparatus of claim 21, wherein the control message further comprises an acknowledgement (ACK)/NACK failure indicator.

25. The apparatus of claim 24, wherein the instructions are executable by the processor to:
determine whether an ACK or a NACK was received for a transmitted CBC, wherein the ACK/NACK failure indicator is based at least in part on the determination whether the ACK or NACK was received.

26. The apparatus of claim 18, wherein the instructions are executable by the processor to:
store a hybrid automatic repeat request (HARQ) state corresponding to a set of transmitted CBCs.

27. An apparatus for communication at a wireless device, comprising:
a processor;
memory in electronic communication with the processor; and
instructions stored in the memory;
wherein the instructions are executable by the processor to:
identify a first redundancy version of a first code block cluster (CBC) for reception in a transport block during a transmission time interval (TTI);
identify a second redundancy version of a second CBC for reception in the transport block during the TTI, wherein identifying the second redundancy version of the second CBC is based at least in part on a transmitted negative-acknowledgement (NACK) for a first redundancy version for the second CBC of a previously received transport block, wherein the second CBC is a portion of the previously received transport block; and
receive the transport block comprising the first redundancy version of the first CBC and the second redundancy version of the second CBC during the TTI.

28. The apparatus of claim 27, wherein the instructions are executable by the processor to:
identify a third CBC corresponding to new data in the transport block.

29. The apparatus of claim 27, wherein the transport block is based at least in part on a set of redundancy version segments, each redundancy version segment of the set comprising one or more CBCs having a same redundancy version.

30. The apparatus of claim 29, wherein the instructions are executable by the processor to:

receive a control message for the TTI comprising an indication of which redundancy version segments are included in the transport block.

* * * * *